(12) United States Patent
Matsuoka

(10) Patent No.: US 10,452,013 B2
(45) Date of Patent: Oct. 22, 2019

(54) IMAGE PROCESSING APPARATUS, IMAGE FORMING APPARATUS, IMAGE PROCESSING METHOD, AND RECORDING MEDIUM

(71) Applicant: Taira Matsuoka, Kanagawa (JP)

(72) Inventor: Taira Matsuoka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 76 days.

(21) Appl. No.: 15/419,893

(22) Filed: Jan. 30, 2017

(65) Prior Publication Data

US 2017/0227904 A1    Aug. 10, 2017

(30) Foreign Application Priority Data

Feb. 4, 2016    (JP) .................. 2016-020198

(51) Int. Cl.
*H04N 1/60* (2006.01)
*G03G 15/00* (2006.01)
*H04N 1/54* (2006.01)
*G03G 15/01* (2006.01)

(52) U.S. Cl.
CPC ......... *G03G 15/50* (2013.01); *G03G 15/0121* (2013.01); *G03G 15/6585* (2013.01); *H04N 1/54* (2013.01); *H04N 1/60* (2013.01); *H04N 1/6027* (2013.01); *H04N 1/6058* (2013.01)

(58) Field of Classification Search
CPC .................................................. H04N 1/40075
See application file for complete search history.

(56) References Cited

U.S. PATENT DOCUMENTS

| | | | | |
|---|---|---|---|---|
| 2003/0081255 A1* | 5/2003 | Shimizu | ........... | H04N 1/46 358/2.1 |
| 2004/0037573 A1* | 2/2004 | Hirota | ........... | G03G 15/0121 399/12 |
| 2005/0243341 A1* | 11/2005 | Ng | ........... | H04N 1/54 358/1.9 |
| 2006/0007465 A1* | 1/2006 | Hayashi | ........... | G06T 5/009 358/1.13 |
| 2006/0120742 A1* | 6/2006 | Kodama | ........... | G03G 15/5062 399/49 |
| 2009/0141310 A1* | 6/2009 | Matsuoka | ........... | H04N 1/40062 358/3.06 |
| 2010/0177131 A1* | 7/2010 | Yoshida | ........... | H04N 1/54 347/5 |
| 2011/0206395 A1* | 8/2011 | Tanaka | ........... | G03G 15/0126 399/46 |
| 2011/0236045 A1* | 9/2011 | Tanaka | ........... | G03G 15/50 399/45 |

(Continued)

FOREIGN PATENT DOCUMENTS

| | | | | |
|---|---|---|---|---|
| EP | 2180375 A2 * | 4/2010 | ......... | G03G 15/5025 |
| JP | 2002-207334 | 7/2002 | | |

(Continued)

*Primary Examiner* — Ted W Barnes
(74) *Attorney, Agent, or Firm* — Duft & Bornsen, PC

(57) ABSTRACT

An image processing apparatus includes: a determining unit configured to determine a parameter for image processing for a special toner plate depending on a type of a special toner other than a process color toner; and an image processing unit configured to process an image of the special toner plate using the determined parameter.

16 Claims, 24 Drawing Sheets

(56) References Cited

U.S. PATENT DOCUMENTS

| | | | | |
|---|---|---|---|---|
| 2011/0273732 | A1* | 11/2011 | Kojima | G01N 21/57 358/1.9 |
| 2012/0051814 | A1* | 3/2012 | Fukamachi | G03G 15/6585 399/341 |
| 2012/0051816 | A1* | 3/2012 | Chiyoda | G03G 15/2064 399/341 |
| 2012/0086987 | A1* | 4/2012 | Tamura | G03G 15/011 358/3.24 |
| 2012/0105915 | A1* | 5/2012 | Kobayashi | H04N 1/52 358/3.06 |
| 2012/0229819 | A1* | 9/2012 | Koyatsu | G03G 15/0126 358/1.1 |
| 2012/0237243 | A1* | 9/2012 | Yamamoto | G03G 15/6585 399/67 |
| 2012/0237244 | A1* | 9/2012 | Yoshikawa | G03G 15/6585 399/67 |
| 2012/0301163 | A1* | 11/2012 | Hirata | G03G 15/0189 399/49 |
| 2012/0320393 | A1* | 12/2012 | Ito | H04N 1/54 358/1.9 |
| 2013/0120801 | A1* | 5/2013 | Shibasaki | H04N 1/6022 358/3.24 |
| 2013/0128291 | A1* | 5/2013 | Shibasaki | H04N 1/54 358/1.9 |
| 2013/0164004 | A1* | 6/2013 | Ai | G03G 15/6585 399/40 |
| 2013/0188205 | A1* | 7/2013 | Nakata | G06K 15/02 358/1.9 |
| 2013/0251431 | A1* | 9/2013 | Numao | G03G 15/6585 399/341 |
| 2013/0258367 | A1* | 10/2013 | Saito | G06K 15/14 358/1.9 |
| 2013/0265608 | A1* | 10/2013 | Yoshida | G06K 15/1878 358/2.1 |
| 2013/0271792 | A1* | 10/2013 | Awamura | H04N 1/6027 358/3.01 |
| 2013/0278943 | A1* | 10/2013 | Kurosawa | G03G 15/0121 358/1.1 |
| 2014/0037307 | A1* | 2/2014 | Kuo | G03G 15/6585 399/40 |
| 2014/0043623 | A1* | 2/2014 | Koyatsu | G03G 15/0121 358/1.1 |
| 2014/0285820 | A1* | 9/2014 | Yasukawa | G03G 15/0189 358/1.1 |
| 2014/0369701 | A1* | 12/2014 | Kuo | G03G 15/50 399/15 |
| 2015/0070738 | A1* | 3/2015 | Itoh | H04N 1/6077 358/523 |
| 2015/0104210 | A1* | 4/2015 | Yoshikawa | G03G 15/6585 399/67 |
| 2016/0041488 | A1* | 2/2016 | Matsuoka | G03G 15/5062 399/15 |
| 2016/0086060 | A1* | 3/2016 | Kubo | B41J 2/2117 399/38 |
| 2016/0165094 | A1* | 6/2016 | Matsuoka | H04N 1/52 358/3.13 |
| 2016/0170359 | A1* | 6/2016 | Itoh | G03G 15/556 358/1.1 |
| 2016/0246239 | A1* | 8/2016 | Yoshikawa | G03G 15/6585 |
| 2016/0248933 | A1* | 8/2016 | Yamada | H04N 1/52 |

FOREIGN PATENT DOCUMENTS

| | | |
|---|---|---|
| JP | 2002207334 A * | 7/2002 |
| JP | 2004-077931 | 3/2004 |
| JP | 4701988 | 3/2011 |
| JP | 2011-237562 | 11/2011 |
| JP | 2012-212131 | 11/2012 |
| JP | 2016-107481 | 6/2016 |

* cited by examiner

| 1 | 9 | 3 | 11 |
|---|---|---|---|
| 13 | 5 | 15 | 7 |
| 4 | 12 | 2 | 10 |
| 16 | 8 | 14 | 6 |

FIG.16
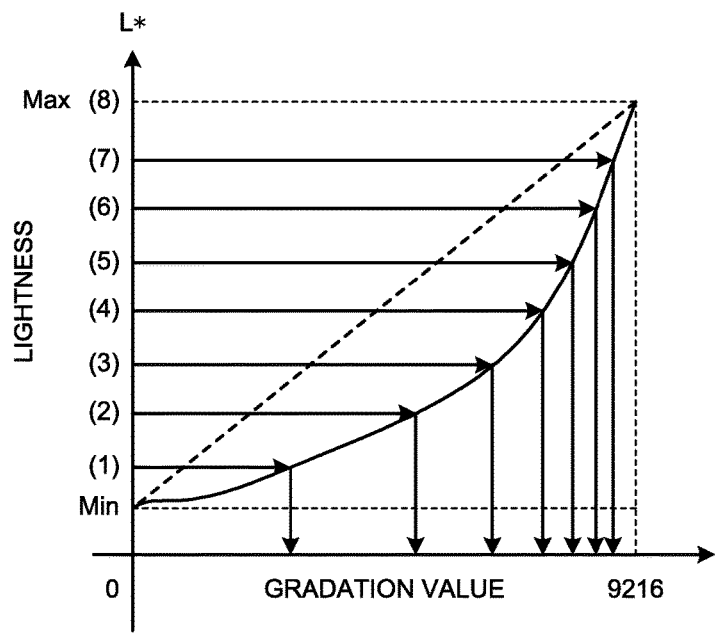
FIG.17
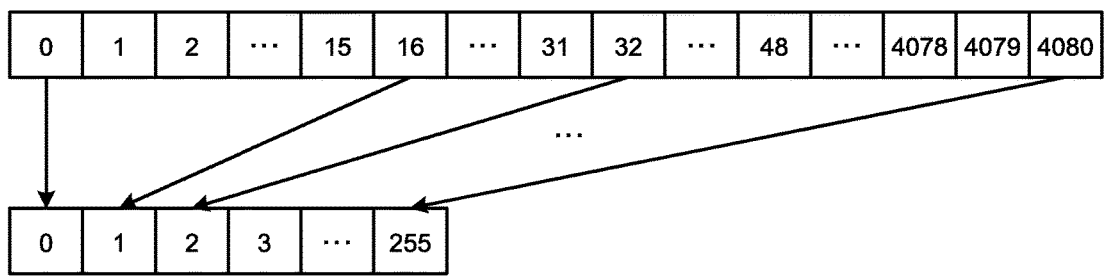
FIG.18
| APPLIED THRESHOLD VALUE | 0 | 16 | 32 | 48 | ... | 4064 | 4080 |
|---|---|---|---|---|---|---|---|
| INPUT GRADATION VALUE | 0 | 1 | 2 | 3 | ... | 254 | 255 |

FIG. 19

| 4080 | 3997 | 1120 | 55   | 14   | 120  | 925  | 3898 | 4077 | 4022 | 1068 | 67   | 30   | 129  | 900  |   |   |
|------|------|------|------|------|------|------|------|------|------|------|------|------|------|------|---|---|
| 4076 | 3820 | 2324 | 298  | 13   | 554  | 2922 | 3484 | 4076 | 3813 | 2350 | 302  | 30   | 518  | 2963 |   |   |
| 1287 | 2716 | 3338 | 2521 | 780  | 2033 | 3206 | 1654 | 1309 | 2742 | 3351 | 2532 | 768  | 2121 | 3206 |   |   |
| 220  | 626  | 3109 | 3736 | 4078 | 3616 | 1790 | 391  | 220  | 690  | 3036 | 3732 | 4079 | 3618 | 1824 |   |   |
| 39   | 144  | 911  | 3880 | 4077 | 3997 | 1126 | 65   | 32   | 127  | 901  | 3884 | 4079 | 3970 | 1075 |   |   |
| 40   | 537  | 2904 | 3427 | 4080 | 3814 | 2329 | 326  | 31   | 554  | 2934 | 3493 | 4078 | 3827 | 2300 | . |   |
| 754  | 2094 | 3240 | 1618 | 1361 | 2748 | 3354 | 2504 | 756  | 2093 | 3244 | 1540 | 1286 | 2798 | 3329 | . |   |
| 4079 | 3578 | 1814 | 401  | 224  | 637  | 3058 | 3720 | 4075 | 3586 | 1811 | 390  | 210  | 665  | 3042 | . |   |
| 4080 | 3992 | 1105 | 56   | 18   | 138  | 952  | 3889 | 4080 | 4018 | 1072 | 74   | 35   | 128  | 944  | . |   |
| 4075 | 3816 | 2363 | 300  | 17   | 511  | 2950 | 3461 | 4080 | 3813 | 2333 | 334  | 35   | 512  | 2943 |   |   |
| 1344 | 2707 | 3332 | 2573 | 756  | 2072 | 3193 | 1650 | 1353 | 2716 | 3348 | 2481 | 760  | 2053 | 3236 |   |   |
| 202  | 688  | 3058 | 3734 | 4079 | 3606 | 1826 | 398  | 210  | 645  | 3074 | 3728 | 4080 | 3576 | 1855 |   |   |
| 11   | 152  | 916  | 3871 | 4076 | 3983 | 1130 | 56   | 29   | 152  | 919  | 3898 | 4076 | 4015 | 1100 |   |   |
| 12   | 546  | 2901 | 3448 | 4076 | 3814 | 2324 | 305  | 30   | 518  | 2888 | 3440 | 4079 | 3814 | 2382 |   |   |
| 795  | 2034 | 3223 | 1628 | 1283 | 2753 | 3354 | 2483 | 788  | 2097 | 3233 | 1578 | 1329 | 2744 | 3305 |   |   |
|      |      |      |      |      | .    | .    | .    | .    |      |      |      |      |      |      |   |   |
|      |      |      |      |      |      |      |      |      |      |      |      |      |      |      |   |   |

FIG. 20

| 255 | 250 | 70  | 4   | 1   | 8   | 58  | 244 | 255 | 252 | 67  | 5   | 2   | 9   | 57  |   |   |
|-----|-----|-----|-----|-----|-----|-----|-----|-----|-----|-----|-----|-----|-----|-----|---|---|
| 255 | 239 | 146 | 19  | 1   | 35  | 183 | 218 | 255 | 239 | 147 | 19  | 2   | 33  | 186 |   |   |
| 81  | 170 | 209 | 158 | 49  | 128 | 201 | 104 | 82  | 172 | 210 | 159 | 48  | 133 | 201 |   |   |
| 14  | 40  | 195 | 234 | 255 | 226 | 112 | 25  | 14  | 44  | 190 | 234 | 255 | 227 | 114 |   |   |
| 3   | 9   | 57  | 243 | 255 | 250 | 71  | 5   | 2   | 8   | 57  | 243 | 255 | 249 | 68  |   |   |
| 3   | 34  | 182 | 215 | 255 | 239 | 146 | 21  | 2   | 35  | 184 | 219 | 255 | 240 | 144 | . |   |
| 48  | 131 | 203 | 102 | 86  | 172 | 210 | 157 | 48  | 131 | 203 | 97  | 81  | 175 | 209 | . |   |
| 255 | 224 | 114 | 26  | 14  | 40  | 192 | 233 | 255 | 225 | 114 | 25  | 14  | 42  | 191 | . |   |
| 255 | 250 | 70  | 4   | 2   | 9   | 60  | 244 | 255 | 252 | 67  | 5   | 3   | 8   | 59  | . |   |
| 255 | 239 | 148 | 19  | 2   | 32  | 185 | 217 | 255 | 239 | 146 | 21  | 3   | 32  | 184 |   |   |
| 84  | 170 | 209 | 161 | 48  | 130 | 200 | 104 | 85  | 170 | 210 | 156 | 48  | 129 | 203 |   |   |
| 13  | 43  | 192 | 234 | 255 | 226 | 115 | 25  | 14  | 41  | 193 | 233 | 255 | 224 | 116 |   |   |
| 1   | 10  | 58  | 242 | 255 | 249 | 71  | 4   | 2   | 10  | 58  | 244 | 255 | 251 | 69  |   |   |
| 1   | 35  | 182 | 216 | 255 | 239 | 146 | 20  | 2   | 33  | 181 | 215 | 255 | 239 | 149 |   |   |
| 50  | 128 | 202 | 102 | 81  | 173 | 210 | 156 | 50  | 132 | 203 | 99  | 84  | 172 | 207 |   |   |
|     |     |     |     |     | .   | .   | .   | .   |     |     |     |     |     |     |   |   |
|     |     |     |     |     |     |     |     |     |     |     |     |     |     |     |   |   |

| APPLIED THRESHOLD VALUE | 0 | 3497 | 4080 |
|---|---|---|---|
| GLOSS LEVEL | 22 | 76 | 85 |

| APPLIED THRESHOLD VALUE | 0 | 14 | 27 | 41 | ... | 3483 | 3497 |
|---|---|---|---|---|---|---|---|
| INPUT GRADATION VALUE | 0 | 1 | 2 | 3 | ... | 254 | 255 |

| APPLIED THRESHOLD VALUE | 0 | 15 | 30 | 44 | ... | 3751 | 3766 |
|---|---|---|---|---|---|---|---|
| INPUT GRADATION VALUE | 0 | 1 | 2 | 3 | ... | 254 | 255 |

FIG.31

| INPUT GRADATION VALUE | 0 | 16 | 32 | 48 | 64 | 80 | 96 | 112 | 128 | 143 | 159 | 175 | 191 | 207 | 223 | 239 | 255 |
|---|---|---|---|---|---|---|---|---|---|---|---|---|---|---|---|---|---|
| APPLIED THRESHOLD VALUE | 0 | 256 | 512 | 768 | 1024 | 1280 | 1536 | 1792 | 2048 | 2288 | 2544 | 2800 | 3056 | 3312 | 3568 | 3824 | 4080 |
| MEASURED DENSITY | 0.1307 | 0.3237 | 0.5018 | 0.6655 | 0.8158 | 0.9532 | 1.0786 | 1.1927 | 1.2963 | 1.3844 | 1.4696 | 1.5464 | 1.6156 | 1.6779 | 1.734 | 1.7847 | 1.8307 |

FIG.32

| APPLIED THRESHOLD VALUE | 0 | 1 | 2 | 3 | 4 | 5 | 6 | 7 | 8 | ... | 4078 | 4079 | 4080 |
|---|---|---|---|---|---|---|---|---|---|---|---|---|---|
| MEASURED DENSITY | 0.1307 | 0.1315 | 0.1323 | 0.1331 | 0.1338 | 0.1346 | 0.1354 | 0.1362 | 0.137 | ... | 1.8304 | 1.8305 | 1.8307 |

FIG.33

| INPUT GRADATION VALUE | 0 | 1 | 2 | 3 | 4 | 5 | ... | 253 | 254 | 255 |
|---|---|---|---|---|---|---|---|---|---|---|
| TARGET DENSITY | 0.1325 | 0.144 | 0.1555 | 0.1669 | 0.1783 | 0.1896 | ... | 1.5789 | 1.5807 | 1.5825 |
| MEASURED DENSITY | 0 | 17 | 31 | 46 | 61 | 75 | ... | 2916 | 2923 | 2930 |

FIG.34

| S00 | K00 | C00 | M00 | Y00 |
|---|---|---|---|---|
| S01 | K01 | C01 | M01 | Y01 |
| S02 | K02 | C02 | M02 | Y02 |
| S03 | K03 | C03 | M03 | Y03 |
| S04 | K04 | C04 | M04 | Y04 |
| S05 | K05 | C05 | M05 | Y05 |
| S06 | K06 | C06 | M06 | Y06 |
| S07 | K07 | C07 | M07 | Y07 |
| S08 | K08 | C08 | M08 | Y08 |
| S09 | K09 | C09 | M09 | Y09 |
| S10 | K10 | C10 | M10 | Y10 |
| S11 | K11 | C11 | M11 | Y11 |
| S12 | K12 | C12 | M12 | Y12 |
| S13 | K13 | C13 | M13 | Y13 |
| S14 | K14 | C14 | M14 | Y14 |
| S15 | K15 | C15 | M15 | Y15 |
| S16 | K16 | C16 | M16 | Y16 |

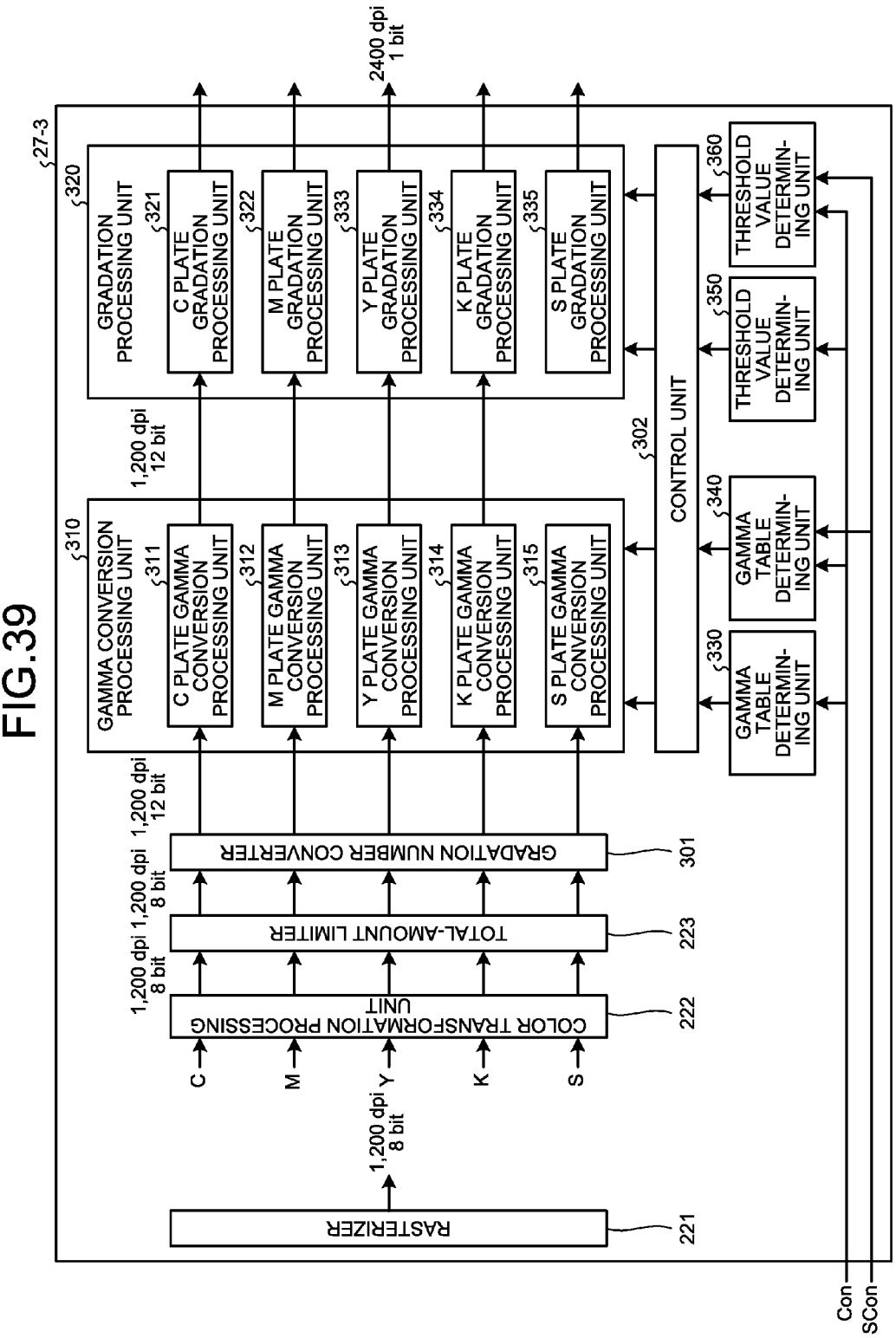

IMAGE PROCESSING APPARATUS, IMAGE FORMING APPARATUS, IMAGE PROCESSING METHOD, AND RECORDING MEDIUM

CROSS-REFERENCE TO RELATED APPLICATIONS

The present application claims priority under 35 U.S.C. § 119 to Japanese Patent Application No. 2016-020198, filed Feb. 4, 2016. The contents of which are incorporated herein by reference in their entirety.

BACKGROUND OF THE INVENTION

1. Field of the Invention

The present invention relates to an image processing apparatus, an image forming apparatus, an image processing method, and a recording medium.

2. Description of the Related Art

A certain type of image forming apparatus is equipped with, in addition to four-color (C (cyan), M (magenta), Y (yellow), and K (black)) toners, a clear toner, which is a colorless toner containing no coloring material. A toner image formed with such a clear toner is fixed onto transfer paper, on which an image has been formed with the C, M, Y, and K toners. As a result, a visual effect and a tactile effect (hereinafter, "surface effect") are produced on the surface of the transfer paper. The surface effect to be produced varies depending on a toner image formed with the clear toner and how the toner image is fixed. Some surface effects may simply give a gloss, while other surface effects may reduce gloss. There are also a need for producing a surface effect to only a part of a surface rather than the entire surface and a need for a surface effect that adds a texture or a watermark with a clear toner. In some cases, surface protection may be desired. A surface effect that can be produced by applying postprocessing using a dedicated postprocessing machine, such as a glosser and a low-temperature fixing machine also exists.

A certain type of image forming apparatus is equipped with, in addition to the four process-color (C, M, Y, and K) toners, a white toner, whose major components are white pigment and a binder resin, containing no colored coloring material except for the single-color, white coloring material. The white toner is used in recent years as a coloring material that adds various values such as, in addition to faithful color reproduction with the process colors, printing on a transparent recording medium, fabric, and colored paper.

Besides, apparatuses that use a fifth toner (special toner) other than the process-color toners, as a coloring material that adds various values have been proposed. Examples of the fifth toner include a gold toner and a silver toner used to reproduce a texture specific to metals, a fluorescent toner that imparts fluorescent effect to a printout, a UV (ultraviolet) toner that makes an applied area visible only when irradiated with black light that emits ultraviolet light, and an orange toner and a green toner each added to reproduce a color that is difficult to reproduce only with the process colors.

Japanese Unexamined Patent Application Publication No. 2002-207334 proposes an image forming apparatus that forms a clear toner layer between a white toner layer and a color toner layer on a transfer material.

However, the conventional technique has the following disadvantage. When images of a plurality of special toners are formed with the same image formation unit, unvarying image processing is performed irrespective of a type of the used special toner. Accordingly, there can be a case where an output image exhibiting an optimal property of the used special toner cannot be obtained.

SUMMARY OF THE INVENTION

According to one aspect of the present invention, an image processing apparatus includes a determining unit, and an image processing unit. The determining unit is configured to determine a parameter for image processing for a special toner plate depending on a type of a special toner other than a process color toner. The image processing unit is configured to process an image of the special toner plate using the determined parameter.

BRIEF DESCRIPTION OF THE DRAWINGS

FIG. 16 is a diagram for describing a method for obtaining gradation values;

FIG. 17 is a diagram for describing an example of gradation-processing threshold values;

FIG. 18 is a diagram illustrating an example of correspondence between applied threshold values and input gradation values;

FIG. 19 is a diagram for describing an example of a process for correcting the gradation-processing threshold values;

FIG. 20 is a diagram for describing the example of the process for correcting the gradation-processing threshold values;

FIG. 31 is a diagram illustrating an example of correspondence relationship among input gradation value, density, and applied threshold value;

FIG. 32 is a diagram illustrating an example of correspondence relationship between applied threshold value and density;

FIG. 33 is a diagram illustrating an example of applied threshold values;

FIG. 34 is a diagram illustrating an example of the calibration sheet;

FIG. 39 is a block diagram illustrating an example functional configuration of an image processing circuit of the second embodiment.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
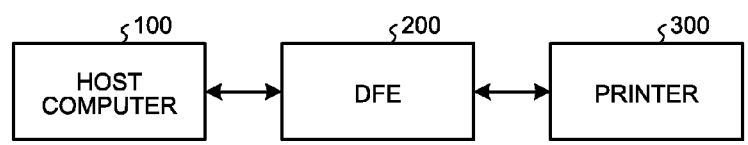
FIG. 1 is a diagram illustrating an example configuration of an image forming system according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of an image processing apparatus, an image forming apparatus, an image processing method, and a recording medium according to the present invention will be described in detail below with reference to the drawings.

An embodiment has an object to obtain an output image exhibiting more appropriate property depending on a type of a special toner.

First Embodiment

Conventional image forming apparatuses capable of printing using a special toner have performed printing using the special toner mainly with an aim of adding higher value; accordingly, not much consideration has been given to optimization of image quality of an image where the special toner is used. For example, even when the same gamma curve (gamma table) or same gradation-processing threshold values are used in gamma conversion processing or gradation processing that is performed as image processing, because a resultant image is not anomalous, less-optimal image quality of the image has been considered as permissible. However, there are increasing needs for printing using a special toner, and an increase in image quality is also desired.

In the present embodiment, type information about a special toner set in an engine is transmitted from the engine to an image processing unit (such as gamma conversion processing units and gradation processing units), thereby setting optimal parameters (gamma tables, gradation-processing threshold values, and the like exhibiting optimal gradation characteristics) depending on a property (type) of the corresponding one of a plurality of special toners. Accordingly, an output image exhibiting more appropriate gradation characteristics can be obtained. For example, for a clear toner, gradation-processing threshold values with which an output image exhibiting linearity with respect to gloss level can be obtained are set; and for a white toner, gradation-processing threshold values with which an output image exhibiting linearity with respect to lightness can be obtained are set.

FIG. 1 is a diagram illustrating an example configuration of an image forming system according to the first embodiment. As illustrated in FIG. 1, the image forming system of the first embodiment includes a host computer 100, a DFE (Digital Front End) 200, and a printer 300, which is an example of "image processing apparatus". Apparatuses to which the image processing apparatus can be applied are not limited to the printer 300. The image processing apparatus is applicable to a wide variety of image processing apparatuses, such as a copier, a facsimile, and a multifunction peripheral having at least two functions of a copier function, a printer function, a scanner function, and a facsimile function, having an image output function.

The host computer 100 transmits image data to be printed and a job command (e.g., print settings) for use in printing the image data to the DFE 200. The host computer 100 is connected to the DFE 200 in any desired form, e.g., via a LAN (Local Area Communications Network) and the Internet. The host computer 100 may be embodied as a typical personal computer, for example.

The DFE 200 controls image formation by the printer 300. The DFE 200 receives the image data from the host computer 100. The DFE 200 generates, from the received image data, image data for use by the printer 300 to form toner images with process-color (C, M, Y, and K) toners and a special toner, and transmits the generated image data to the printer 300.

At least the C, M, Y, and K toners and the special toner are mounted on the printer 300. Furthermore, for each of the toners, an image formation unit, an exposure device, and a fixing device are mounted on the printer 300. The image formation unit includes, for example, a photoconductor, a charging device, a developing device, and a photoconductor cleaner. A user can perform setting of a gloss-level designation mode for controlling a gloss level of an output image using a printer driver, thereby instructing the DFE 200.

The special toner is a special coloring material used to add value. Examples of the special toner include a clear toner, a white toner, a gold toner, a silver toner, a fluorescent toner, a UV toner, an orange toner, and a green toner. The clear toner is a substantially colorless and transparent toner. The white toner is a toner that contains no colored coloring material except for a single-color, white coloring material. Each of the gold toner and the silver toner is used to reproduce a texture specific to metals. The fluorescent toner is used to impart fluorescent effect to a printout. The UV toner makes an applied area visible only when irradiated with black light that emits ultraviolet light. Each of the orange toner and the green toner is a toner (wide-color-gamut reproduction toner) to be added to reproduce a color that is difficult to reproduce only with the process colors. A toner of a color other than orange and green may be used as a wide-color-gamut reproduction toner.

One of a plurality of special toners, for example, is mounted on the printer 300. The printer 300 has a mechanism that allows replacement of the mounted special toner when the printer 300 is not performing a printing operation. A user can change and use the mounted special toner depending on desired added value.

Figure 2:
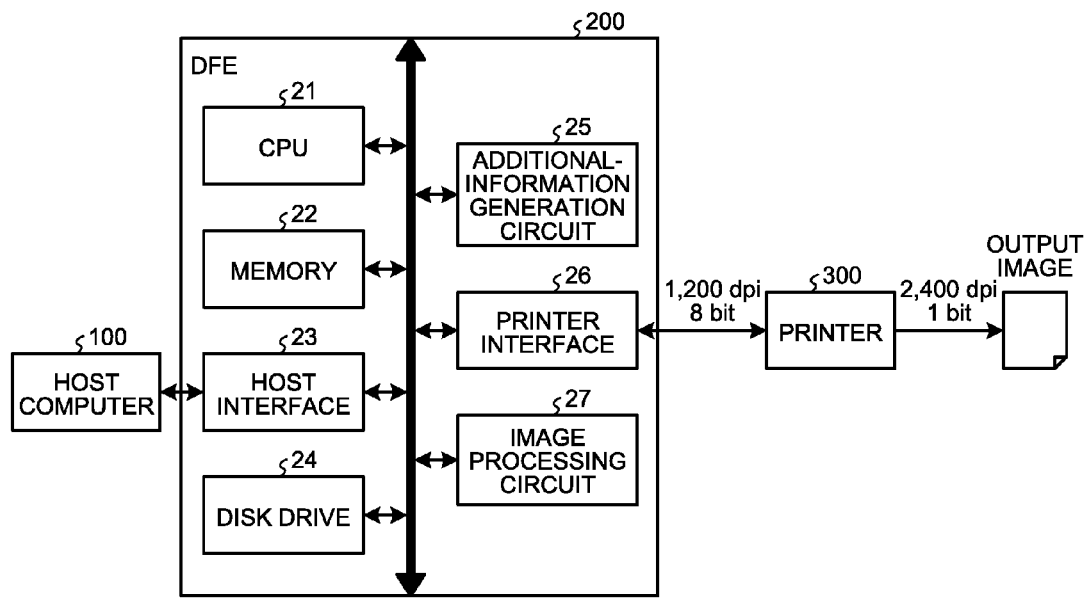
FIG. 2 is a diagram illustrating an example of a hardware configuration of a DFE.

FIG. 2 is a diagram illustrating an example of a hardware configuration of the DFE 200. As illustrated in FIG. 2, the DFE 200 includes a CPU (Central Processing Unit) 21, a memory 22, a host interface 23, a printer interface 26, a disk drive 24, an additional-information generation circuit 25, and an image processing circuit 27.

The CPU 21 controls the entire DFE 200 in accordance with control program instructions stored in the memory 22 and commands fed from the host computer 100. The memory 22 is used as a working memory of the CPU 21, an input data buffer, a memory for downloaded fonts, and the like.

The host interface 23 is an interface communicating with the host computer 100. The printer interface 26 is an interface communicating, to and from the printer 300, a print status of the printer 300, a print mode, print data, and information about a type of the special toner. The disk drive 24 is the disk drive 24 (e.g., a hard disk drive) that stores font data, program instructions, print data, and the like.

The additional-information generation circuit 25 adds, to each pixel's data contained in the image data, information (object information) indicating a type of an object to which the pixel's data belongs. Objects may be classified into, for example, three types: text, graphics, and image. The additional-information generation circuit 25 also adds information, such as a user's print settings (e.g., halftone-mode setting information) and document information, to be used by the image processing circuit 27 to the image data and transmits the image data to the image processing circuit 27.

The image processing circuit 27 performs 1,200 dpi, 8-bit rasterization on the image data transmitted from the host computer 100 and performs color transformation and a total-amount limiting process that depend on an input color space and an output color space. The image-processed image data is transmitted to the printer 300 via the printer interface 26. The resolution (dpi) and the bit depth of the rasterization are not limited to 1,200 dpi and 8-bit.

A part or all of the functions of the additional-information generation circuit 25 and the image processing circuit 27 may be implemented by causing a processing device, such as the CPU 21, to execute program instructions or, in short, in software.

Figure 3:
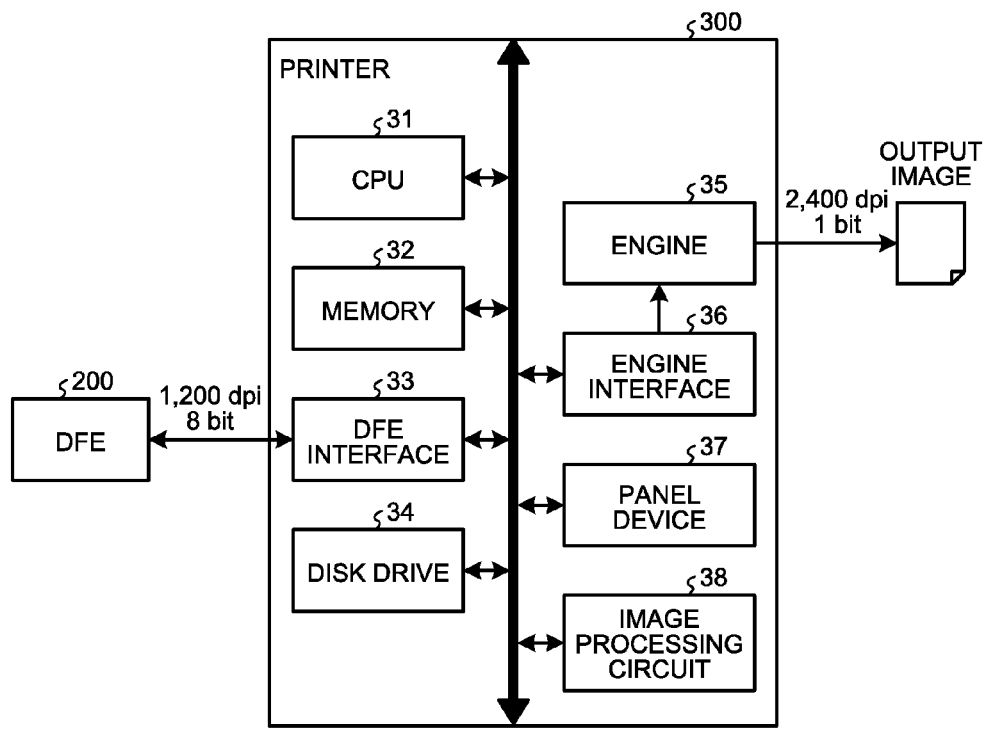
FIG. 3 is a diagram illustrating an example of a hardware configuration of a printer.

FIG. 3 is a diagram illustrating an example of a hardware configuration of the printer 300. As illustrated in FIG. 3, the printer 300 includes a CPU 31, a memory 32, a DFE interface 33, an engine interface 36, a disk drive 34, a panel device 37, an image processing circuit 38 (image processing unit), and an engine 35.

The CPU 31 controls the entire printer 300 in accordance with control program instructions stored in the memory 32 and commands fed from the DFE 200. The memory 32 is used as a working memory of the CPU 31, an input data buffer, and the like.

The DFE interface 33 is an interface communicating with the DFE 200. For example, the DFE interface 33 receives image data transmitted from the DFE 200. The received image data is processed by the image processing circuit 38 and, thereafter, transmitted to the engine 35 via the engine interface 36.

The engine 35 performs an electrophotographic process on the image data and outputs the processed image data. For each of the process-color toners and the special toner, a set of an image formation unit, an exposure device, and a fixing device is mounted on the engine 35. For example, five sets (for C, M, Y, K, and the special toners) may be mounted on the engine 35. The image formation unit includes, for example, a photoconductor, a charging device, a developing device, and a photoconductor cleaner. Thus, the engine 35 functions as an image forming unit that forms images of process-color toner plates and special toner plate on a recording medium. The recording medium is not limited to a paper medium (e.g., transfer paper).

The disk drive 34 is, for example, a hard disk drive that stores font data, program instructions, print data, and the like. The panel device 37 is an input/output device, such as a touch panel, to be used by a user to perform paper settings, print settings, and the like.

The image processing circuit 38 performs image processing, such as gamma conversion processing and gradation processing, on the image data transmitted from the DFE 200. For example, the image processing circuit 38 performs gamma conversion processing and gradation processing on 1,200 dpi, 8-bit image data transmitted from the DFE 200, thereby converting the image data into 2,400 dpi, 1-bit image data. Optimal image data for output from the engine 35 is thus generated.

A part or all of the functions of the image processing circuit 38 may be implemented by causing a processing device, such as the CPU 31, to execute program instructions or, in short, in software.

Figure 4:
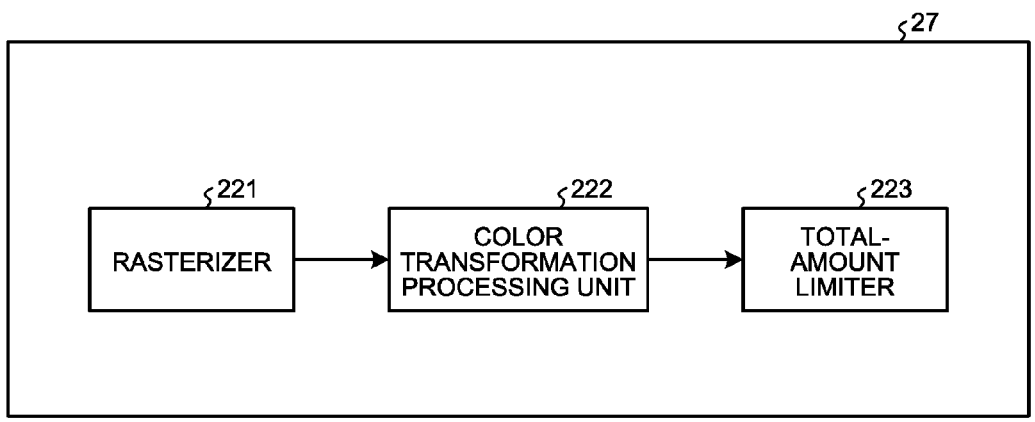
FIG. 4 is a block diagram illustrating an example functional configuration of an image processing circuit of the DFE.

FIG. 4 is a block diagram illustrating an example functional configuration of the image processing circuit 27 of the DFE 200. As illustrated in FIG. 4, the image processing circuit 27 includes a rasterizer 221, a color transformation processing unit 222, and a total-amount limiter 223.

The rasterizer 221 performs rasterization on image data (input image data) received from the host computer 100, for example. The input image data transmitted from the host computer 100 via the host interface 23 is in a data format interpretable by the printer 300 and classified into, for example, a text object(s), a graphic object(s), and an image object(s). The rasterizer 221 interprets the data format of the input image data and converts the input image data into bitmap images object by object. As a color space of the image data, any color space, e.g., the RGB color space or the CMYK color space, can be used.

S plate (special toner plate) data created by a user may also be transmitted from the host computer 100. The S plate data is not necessarily created by a user, and may alternatively be internally created in the DFE 200. For example, the DFE 200 refers to the object information to generate S plate data for forming a special toner image(s) that is uniformly of 100%, only at the image object(s).

The color transformation processing unit 222 performs color transformation on the input image data. For example, the color transformation processing unit 222 may perform profile conversion of converting a color space of the input image data into a user-specified color space. Hence, the color transformation processing unit 222 can transform input image data into image data of the CMYK color space adapted to characteristics of the engine 35 or transform input image data into a gray-scale image using brightness information.

The total-amount limiter 223 performs a total-amount limiting process that controls a total amount of the toners to prevent placing an excessive load on a process and to prevent a fixing failure. Hereinafter, image data input to the total-amount limiter 223 is referred to as C, M, Y, K, and S, while image data output from the total-amount limiter 223 is C', M', Y', K', and S'. Each of C, M, Y, K, and S is 8-bit data ranging in value from 0 to 255.

A total toner amount permissible in the process is referred to as limA. In this example, limA is set to 700. When input image data does not contain S plate data, the following equations hold: $K'=K$, $C'=\alpha \times C$, $M'=\alpha \times M$, and $Y'=\alpha \times y$, where $\alpha=(limA-K)/(C+M+Y)$. When input image data contains S plate data, the S plate data of a certain amount is secured even when a limit is imposed on the total amount. Accordingly, the total-amount limiting process varies depending on whether the S plate data is equal to or larger than limS or smaller than limS.

When the S data is equal to or larger than limS, the following equations hold: $K'=K$, $C'=\alpha \times C$, $M'=\alpha \times M$, $Y'=\alpha \times Y$, and $S'=limS$, where $\alpha=(limA-K-limS)/(C+M+Y)$.

When the S data is smaller than limS, the following equations hold: $K'=K$, $C'=\alpha \times C$, $M'=\alpha \times M$, $Y'=\alpha \times Y$, and $S'=S$, where $\alpha=(limA-K-S)/(C+M+Y)$.

For example, 8-bit bitmap image data undergoes color transformation performed by the color transformation processing unit 222 and then undergoes the total-amount limiting process performed by the total-amount limiter 223. Thereafter, the resultant 1,200 dpi, 8-bit image data (C, M, Y, K, and S) is transmitted to the printer 300. In the printer 300, the image processing circuit 38 performs gamma conversion processing and gradation processing, thereby obtaining gradation characteristics optimal for printing. Thereafter, the image data converted into 2,400 dpi, 1-bit image data is transmitted via the engine interface 36 to the engine 35, where the image data is printed on a recording medium.

Figure 5:
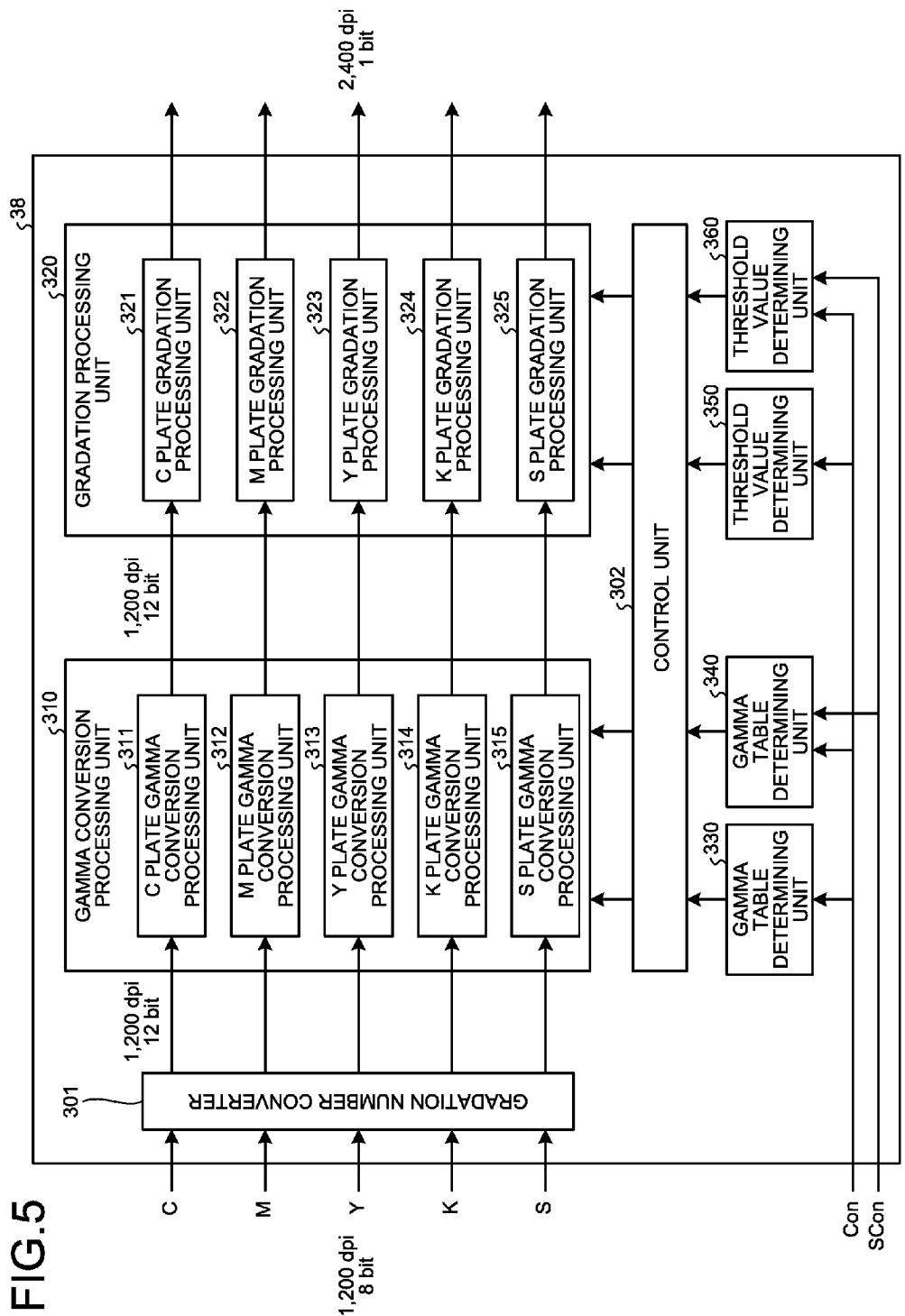
FIG. 5 is a block diagram illustrating an example functional configuration of an image processing circuit of the printer.

FIG. 5 is a block diagram illustrating an example functional configuration of the image processing circuit 38 of the printer 300. As illustrated in FIG. 5, the image processing circuit 38 includes a gradation number converter 301, a gamma conversion processing unit 310, a gradation processing unit 320, a gamma table determining unit 330, a gamma table determining unit 340, a threshold value determining unit 350, a threshold value determining unit 360, and a control unit 302.

To the image processing circuit 38, 1,200 dpi, 8-bit image data for five plates (C, M, Y, K, and S) and control information (a Con signal and an SCon signal) for use in controlling gamma tables and gradation-processing threshold values are fed. The Con signal contains object classification information, the document information such as a print mode, and paper information that are generated and added by the DFE 200. The SCon signal contains type information about a special toner (the white toner, the clear toner, the metallic toner, or the like) set in the printer 300. The type information may be stored in the memory 32 or the like when the special toner is set in the engine 35. For example, the control unit 302 may read out the thus-stored data from the memory 32 and send the data to the image processing circuit 38.

The control unit 302 controls overall operations of the image processing circuit 38. The control unit 302 may have a function as a generator that generates a calibration image, which is an image to be printed on a calibration sheet. The calibration sheet is a recording medium for measuring a property of an output image. The calibration sheet will be described in detail later.

The gradation number converter 301 shifts the input 1,200 dpi, 8-bit image data for the five plates (C, M, Y, K, and S) by 4 bits, thereby converting the input image data to 1,200 dpi, 12-bit data (whose values range from 0 to 4080). If processing of the gamma conversion processing unit 310 and the gradation processing unit 320 described below is applied to 8-bit input data to yield 8-bit output data, an effective number of gradations reduces in the gradation conversion. However, if the same processing is applied to input data converted into 12-bit data by the gradation number converter 301, the effective number of gradations can be maintained at 8 bits. As a result, degradation in image quality caused by gradation jump can be prevented.

The gamma conversion processing unit 310 performs gamma conversion processing. For example, the gamma conversion processing unit 310 performs gamma conversion processing using gamma tables (manual gammas) that can be designated by a user using the printer driver or the like. The manual gammas may be designated individually for the C plate, the M plate, the Y plate, the K plate, and the S plate and can be selected from gamma tables entered and stored by a user in advance. The gamma conversion processing unit 310 includes, as functions for performing gamma conversion processing for each of the plates, a C plate gamma conversion processing unit 311, an M plate gamma conversion processing unit 312, a Y plate gamma conversion processing unit 313, a K plate gamma conversion processing unit 314, and an S plate gamma conversion processing unit 315.

The gamma table determining unit 330 determines gamma tables for the process-color toners. For example, the gamma table determining unit 330 reads out gamma tables for the C plate, the M plate, the Y plate, and the K plate stored in the memory 32 through the manual-gamma registration operation by a user and sets each of the read-out gamma tables in a corresponding one of the C plate gamma conversion processing unit 311, the M plate gamma conversion processing unit 312, the Y plate gamma conversion processing unit 313, and the K plate gamma conversion processing unit 314.

The gamma table determining unit 340 (an example of "determining unit") determines a gamma table for a special toner. For example, the gamma table determining unit 340 reads out a gamma table for the special toner stored in the memory 32 through the manual-gamma registration operation by a user and sets the read-out gamma table to the S plate gamma conversion processing unit 315.

A user can store a plurality of manual gammas. There is a demand to set one of manual gammas which differ in shape, depending on a type of the special toner. In the first embodiment, an appropriate manual gamma is set depending on a set special toner. For example, when the clear toner is set as the special toner, a manual gamma for the clear toner is set.

Figure 6:
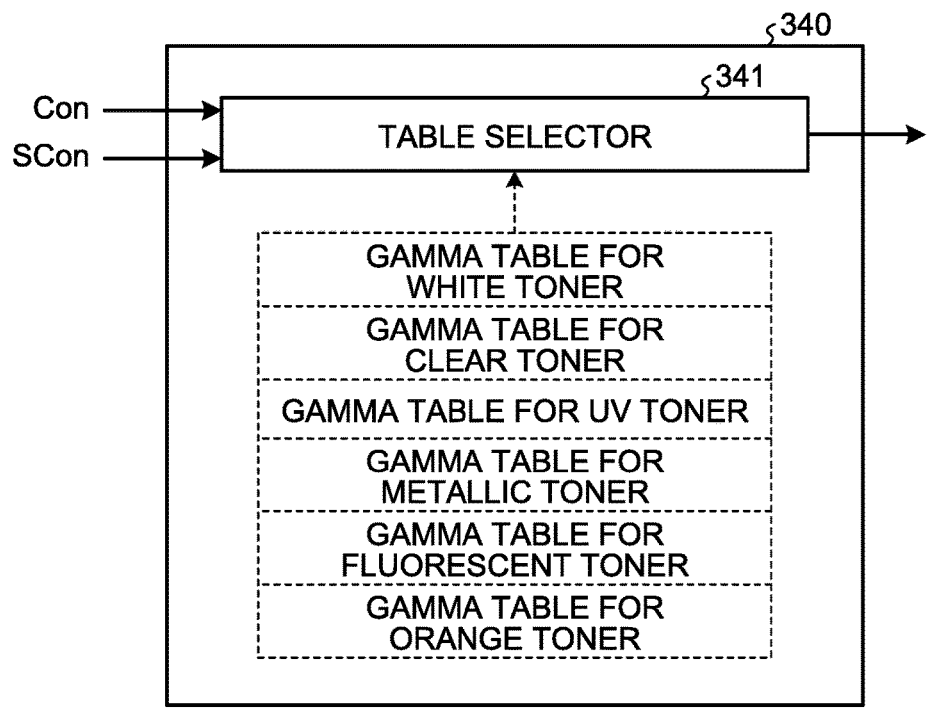
FIG. 6 is a block diagram illustrating an example of a detailed functional configuration of a gamma table determining unit.

FIG. 6 is a block diagram illustrating an example of a detailed functional configuration of the gamma table determining unit 340. As illustrated in FIG. 6, the gamma table determining unit 340 includes a table selector 341. The table selector 341 selects a gamma table associated with a special toner mounted on the printer 300. For example, as many gamma tables as the number of types of the special toner usable in the printer 300 are stored in the memory 32. The table selector 341 selects a gamma table associated with a toner of the type indicated by the special-toner type information contained in the Scon signal. The selected gamma table is set in the gamma conversion processing unit 310 by the control unit 302, for example. By performing operations in this manner, a manual gamma exhibiting optimal gradation characteristics can be set depending on a type of the special toner to be used.

Figure 7:
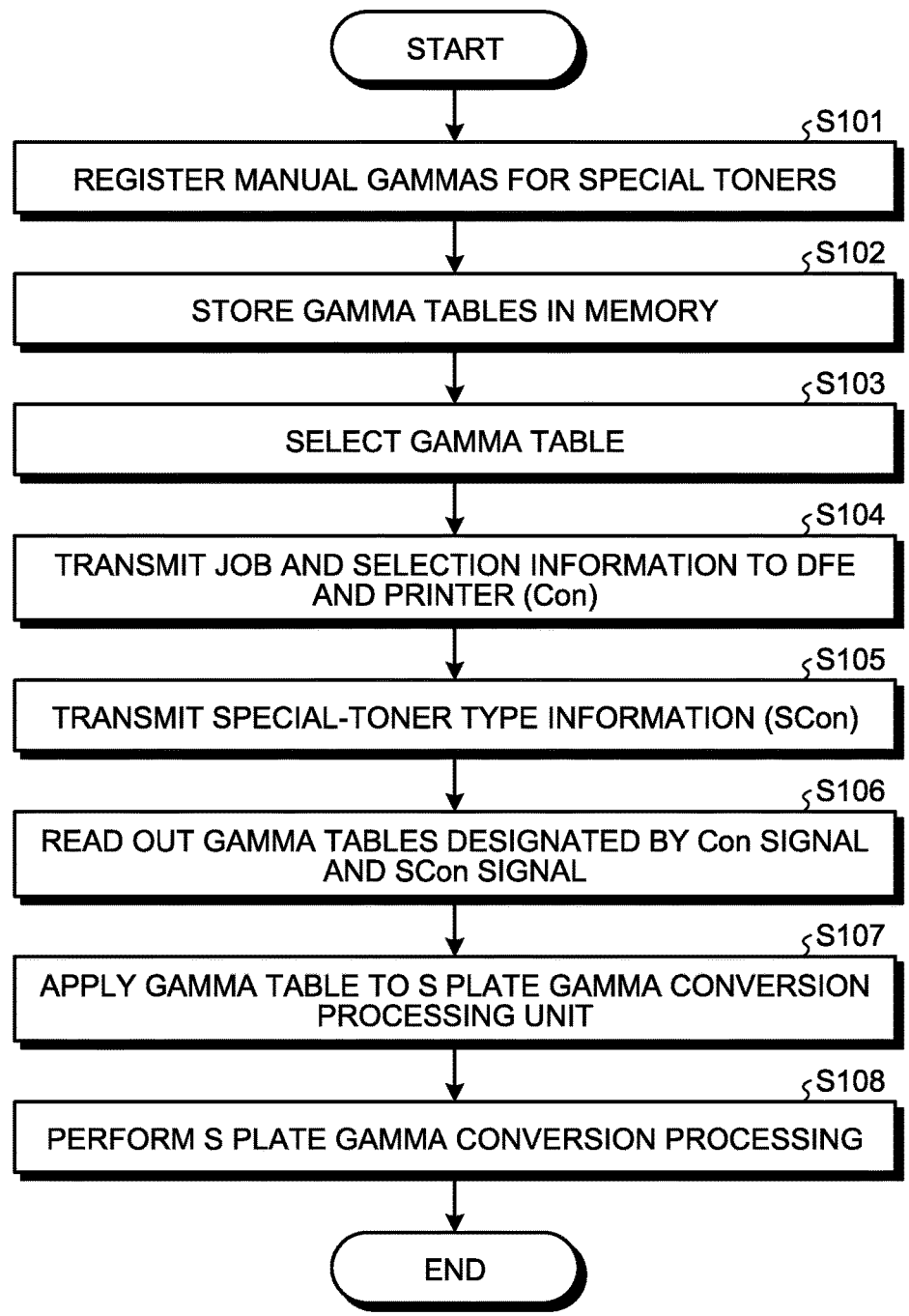
FIG. 7 is a flowchart illustrating an example of an overall flow of gamma conversion processing.

FIG. 7 is a flowchart illustrating an example of an overall flow of the gamma conversion processing. Although FIG. 7 illustrates only processing pertaining to the gamma conversion processing unit 310, at printing, processing (gradation processing) pertaining to the gradation processing unit 320, which will be described later, may be performed in conjunction therewith.

The control unit 302 accepts registration of manual gammas for special toners from a user, for example (S101). For example, the user may enter the manual gammas using the panel device 37. The control unit 302 stores the entered gamma tables in the memory 32, for example (S102). Processing at S101 and S102 may be performed prior to a printing process, for example. The control unit 302 may be configured to be capable of accepting registration of a plurality of manual gammas for each type of the special toner. In this case, the control unit 302 may be configured to enable a user to select a default manual gamma from the plurality of manual gammas.

For example, at printing, a user designates the default gamma table for special-toner using the printer driver, for example. The host computer 100 selects the gamma table for the special-toner that the user designates (S103). The host computer 100 transmits a job and selection information indicating the selected gamma table to the DFE 200 and the printer 300 (S104). The selection information may be fed to the image processing circuit 38 in a form of being contained in the SCon signal.

The control unit 302, for example, transmits special-toner type information to the image processing circuit 38 (S105). The type information is stored in, for example, the memory 32 as described above. A configuration, in which the engine 35 transmits the type information to the image processing circuit 38 at printing, may be employed.

The gamma table determining units 330 and 340 read out gamma tables designated by the Con signal and the SCon signal (S106). For example, the gamma table determining unit 330 determines gamma tables for the process-color toners in accordance with selection information contained in the Con signal. For example, the table selector 341 of the gamma table determining unit 340 selects, in accordance with the special-toner type information contained in the Scon signal, a gamma table for a special toner indicated by the type information. When a plurality of manual gammas are entered and stored for the special toner indicated by the type information, the manual gamma selected at S103 is selected from the plurality of manual gammas.

The gamma table determining unit 340 sets the gamma table for the special toner read out in this manner in the S plate gamma conversion processing unit 315 (S107). Thereafter, the S plate gamma conversion processing unit 315 performs gamma conversion processing for the S plate (S108).

Similarly, the gamma table determining unit 330 sets each of the read-out gamma tables for the process-color toners in a corresponding one of the gamma conversion processing units (the C plate gamma conversion processing unit 311, the M plate gamma conversion processing unit 312, the Y plate gamma conversion processing unit 313, and the K plate gamma conversion processing unit 314). Thereafter, the gamma conversion processing units perform conversion processing for C, M, Y, and K plates.

Referring back to FIG. 5, functions (the gradation processing unit 320, the threshold value determining unit 350, and the threshold value determining unit 360) pertaining to gradation processing are described.

The gradation processing unit 320 performs gradation processing on C plate data, M plate data, Y plate data, K plate data, and S plate data after gamma conversion processing. For example, the gradation processing unit 320 performs gradation processing on the C, M, Y, K, and S plate data in accordance with a halftone mode designated by a user using the printer driver or the like. The gradation processing unit 320 includes, as functions that perform gradation processing on data of the respective plates, a C plate gradation processing unit 321, an M plate gradation processing unit 322, a Y plate gradation processing unit 323, a K plate gradation processing unit 324, and an S plate gradation processing unit 325.

The threshold value determining unit 350 determines threshold values (gradation-processing threshold values) for use in gradation processing for the process-color toners. For example, the threshold value determining unit 350 determines gradation-processing threshold values stored in the memory 32 for the C, M, Y, and K plates in accordance with the user-designated halftone mode. The threshold value determining unit 350 sets the determined gradation-processing threshold values in the C plate gradation processing unit 321, the M plate gradation processing unit 322, the Y plate gradation processing unit 323, and the K plate gradation processing unit 324.

The threshold value determining unit 360 (an example of "determining unit") determines threshold values (gradation-processing threshold values) for use in gradation processing for the special toner. For example, the threshold value determining unit 360 reads out gradation-processing threshold values and applied threshold values (which will be described later) for the special toner stored in the memory 32 and sets the gradation-processing threshold values in the S plate gradation processing unit 325.

Figure 8:
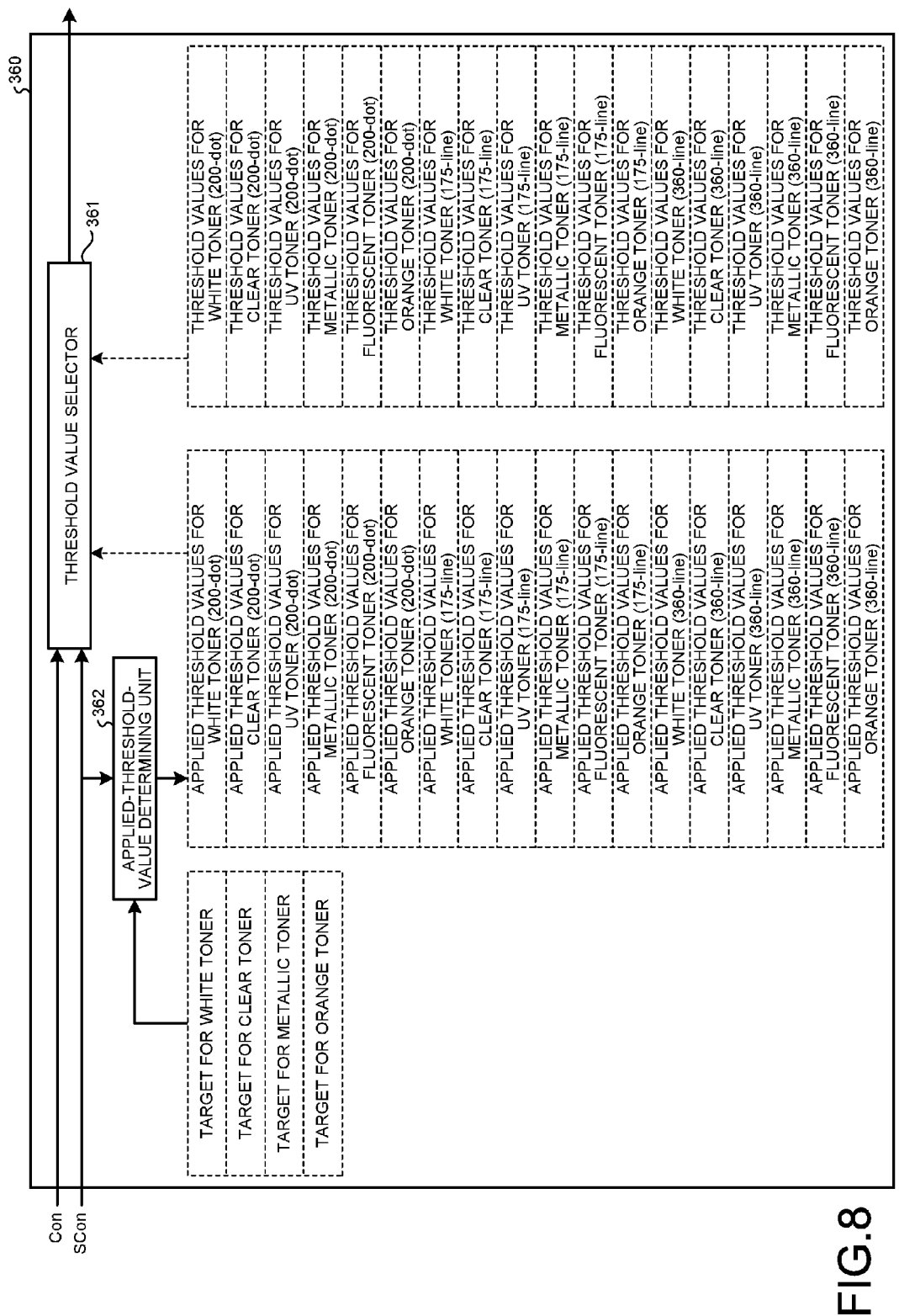
FIG. 8 is a block diagram illustrating an example of a detailed functional configuration of a threshold value determining unit.

FIG. 8 is a block diagram illustrating an example of a detailed functional configuration of the threshold value determining unit 360. As illustrated in FIG. 8, the threshold value determining unit 360 includes a threshold value selector 361 and an applied-threshold-value determining unit 362. As many gradation-processing threshold values as the number of types of the special toner usable in the printer 300 are stored in the memory 32 for the special-toner, for example. In the example of FIG. 8, for each of the white toner, the clear toner, the metallic toner, the fluorescent toner, and the orange toner, gradation-processing threshold values for each of 200-dot, 175-line, and 360-line halftone modes are set.

The threshold value selector 361 selects gradation-processing threshold values of a toner type indicated by the special-toner type information contained in the SCon signal, for example. The threshold value determining unit 360 sets the selected gradation-processing threshold values in the gradation processing unit 320. The threshold value selector 361 changes the gradation-processing threshold values based on, in addition to the type information, the halftone-mode setting information and the object information contained in the Con signal.

For example, when a "200-dot, fine text" halftone mode is designated, the threshold value selector 361 selects, for each image object and graphic object, gradation-processing threshold values for the 200-dot screen and selects, for each text object, gradation-processing threshold values for the 360-line screen. For example, when a "175-dot, fine text" halftone mode is designated, the threshold value selector 361 selects, for each image object and graphic object, gradation-processing threshold values for the 175-line screen and selects, for each text object, gradation-processing threshold values for the 360-line screen.

Figure 9:
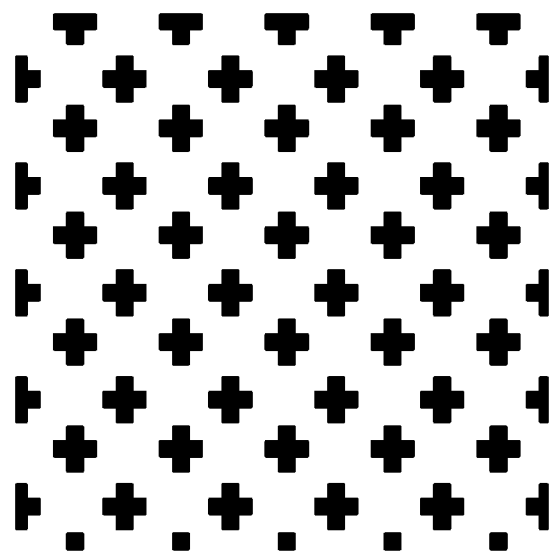
FIG. 9 is a view illustrating an example of a 200-dot screen.

Note that "200-dot" denotes a 200-line halftone screen; "360-line" denotes a 360-line line screen. FIG. 9 is a view illustrating an example of the 200-dot screen. Halftone modes and screens are not limited to the foregoing, but any conventionally-used halftone mode and screen can be used. The process of selecting the gradation-processing threshold values depending on the halftone mode and the screen may be skipped.

For all of the C, M, Y, K, and S plates, gradation-processing threshold values with which the number of gradations (e.g., 4,080) larger than the number of gradations of input image data (input gradation number; e.g., 256) can be processed, are prepared in advance. Threshold values (applied threshold values) for use in gradation processing with the input gradation number are determined using the gradation-processing threshold values depending on a calibration result. Furthermore, using the thus-determined applied threshold values, gradation processing having the number of gradations (e.g., 256) that is to be finally obtained is performed. Performing gradation processing separately on all the input image data of the 256 gradations that is to be fed to the image processing circuit 38 and thereafter converting the processed image data into 2,400 dpi, 1-bit data can thus be done. Details of the applied-threshold-value determining unit 362 and a method for creating the gradation-processing threshold values (the threshold values for processing 4,080 gradations) that are to be prepared in advance are described later.

By performing processing as described above, optimal gradation conversion can be performed depending on the type of the special toner to be used among the plurality of special toners and, as a result, an output image exhibiting optimal gradation characteristics can be obtained. An example of the advantage is described below.

Figure 10:
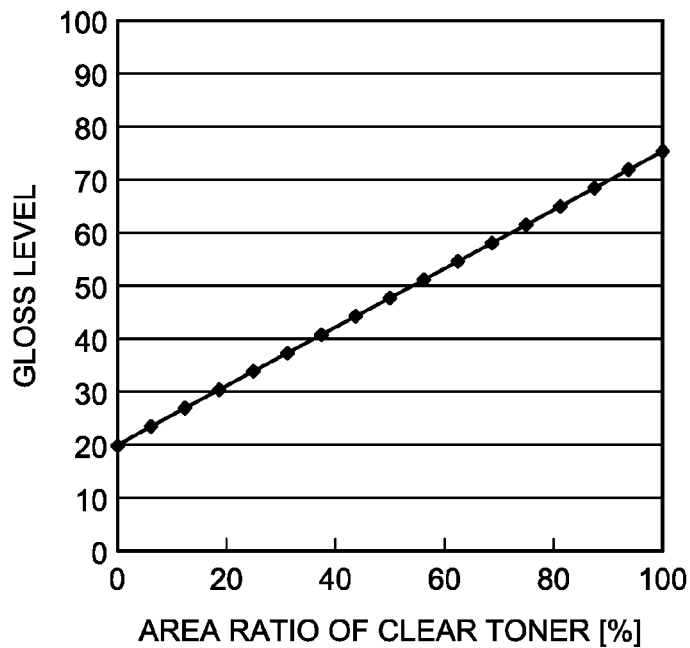
FIG. 10 is a graph of area ratio versus gloss level.

FIG. 10 is a graph of area ratio (a proportion of an area occupied by halftone dots) versus gloss level in an example where clear toner printing is performed on white paper. By setting gradation-processing threshold values with which the area ratio varies linearly with the gloss level, in this manner, smoothly-varying gloss level, which is desired of clear toner printing, can be achieved. This state is a state "optimized for the clear toner".

Figure 11:
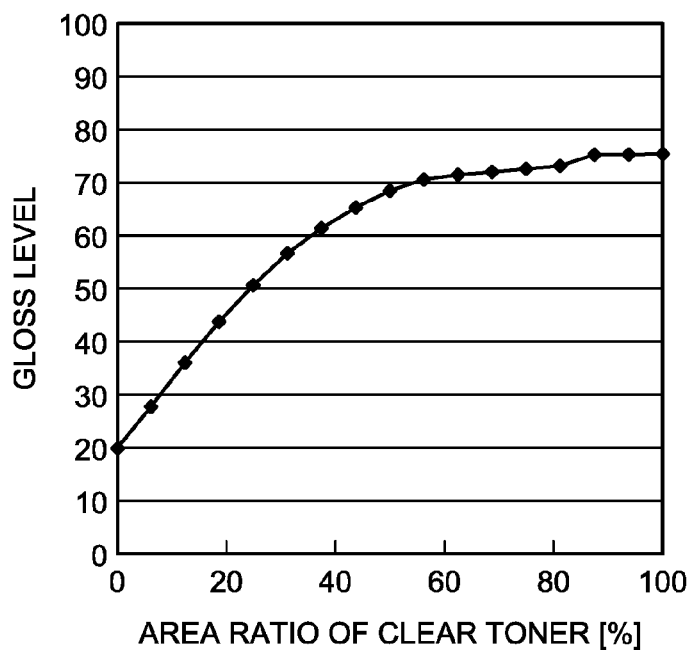
FIG. 11 is a graph illustrating an example of how gloss level varies.

FIG. 11 is a graph illustrating an example of how gloss level varies if clear toner printing is performed using "gradation-processing threshold values optimized for the white toner". Even though the clear toner is used, the gloss level changes only minutely in a range where the area ratio is equal to 60% or higher; hence, an optimal state is not attained.

Figure 12:
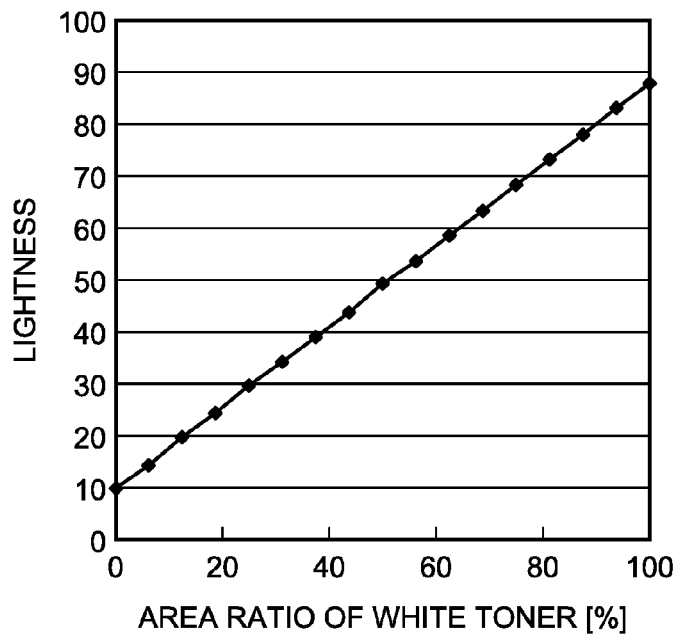
FIG. 12 is a graph of area ratio versus lightness.

The "gradation-processing threshold values optimized for the white toner" are described with reference to FIG. 12. FIG. 12 is a graph of area ratio versus lightness in an example where white toner printing is performed on black paper. Generally, gradation difference grasped by human eyes is said to be proportional to a lightness difference. Accordingly, by setting such gradation-processing threshold values with which the area ratio varies linearly with the lightness as in FIG. 12, gradation characteristics optimized for white toner printing can be obtained.

Figure 13:
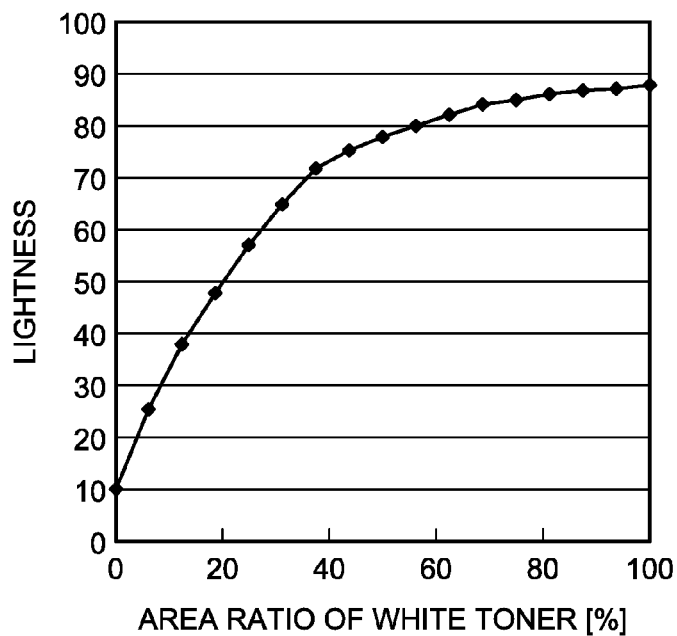
FIG. 13 is a graph illustrating an example of how lightness varies.

FIG. 13 is a graph illustrating an example of how gloss level varies if white toner printing is performed using "gradation-processing threshold values optimized for the clear toner". Put another way, the graph of FIG. 13 illustrates a result obtained by performing printing using the same gradation-processing threshold values as in printing of FIG. 10. As illustrated in FIG. 13, the area ratio is not linear to the lightness and the gradation collapses in a range where the area ratio of the white toner is high.

As described above with reference to FIG. 10 to FIG. 13, gradation-processing threshold values for obtaining optimal gradation characteristics vary depending on a type of the special toner. Accordingly, it is desirable to use gradation-processing threshold values adjusted depending on the type of the special toner so that optimal gradation characteristics can be obtained. For example, it is desirable to predetermine, for each type of the special toner, gradation-processing threshold values such that a specific relationship holds between area ratio and predetermined property of an output image after performing the gradation processing. The property of the output image may vary from one type of the special toner to another. As described above with reference to FIG. 10 to FIG. 13, gloss level and lightness may be used as the property of the clear toner and the property of the white toner, respectively.

Figures 14, 15:
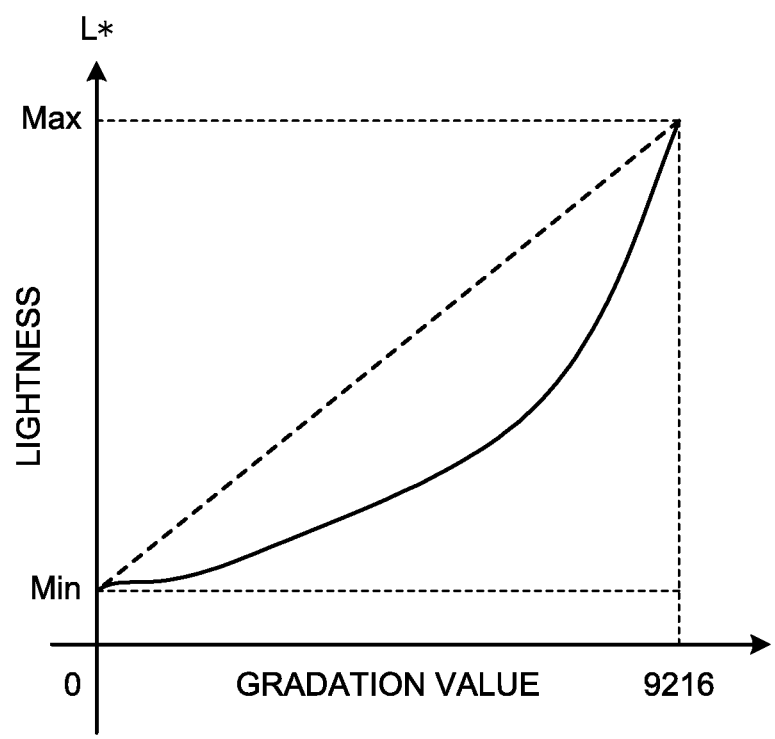
FIG. 14 is a diagram illustrating an example of 4×4 unit submatrices.
FIG. 15 is a graph illustrating an example of lightness property.

An example of a method for obtaining 4,080-level gradation-processing threshold values, with which a specific relationship holds between area ratio and property, is described below. When 2,400 dpi, 1-bit dither is to be used as in the first embodiment, 9,216 gradations can be rendered using the dither with the size of 96×96. By appropriately selecting 4,080 gradations from data of 9,216 gradations, gradation-processing threshold values exhibiting desired gradation characteristics can be obtained. When amplitude modulation (AM) screening is to be used, a 24×24 dither is used as a one unit submatrix, and the submatrices are arranged in the 4×4 unit basis to prepare the dither of the size of 96×96. FIG. 14 is a diagram illustrating an example of the dither matrix including the 4×4 unit submatrices.

Assume that such lightness property as indicated by the solid line in FIG. 15 is obtained by performing white toner printing using 9,216-level dither. It is preferable that the white toner exhibits a property that the gradation value is linear relative to lightness (dashed line of FIG. 15). Accordingly, gradation values that are linear to lightness are obtained as follows.

FIG. 16 is a diagram for describing a method for obtaining the gradation values. First, a range between a maximum lightness (Max) and a minimum lightness (Min) is divided into 4,080 equal segments to calculate lightnesses at 4,080 gradations that are to be finally obtained. Next, data representing gradation values corresponding to lightnesses closest to the calculated lightnesses are selected. For convenience of description, FIG. 16 illustrates an example where the range is divided into 8 equal segments. Data representing 8 gradations that are linear to lightness can be obtained by picking up gradation values at which the arrow tips reach the horizontal axis. Thus, 4,080-level data that is linear to lightness can be obtained from the 9,216-level data. In a case where shortage of the number of gradations occurs (e.g., lightnesses closest to a plurality of the calculated lightnesses overlap), it suffices to increase the number of gradations by, for example, increasing the number of submatrices arranged in FIG. 14.

Description with reference to FIG. 15 and FIG. 16 has been made through an example where the white toner is used as the special toner and lightness is used as the property. For the other special toners, it suffices to take gloss levels on the vertical axis perform processing in a similar manner using an appropriate property. For example, to prepare threshold values for the clear toner, it suffices to take gloss levels on the vertical axis to perform similar processing. Furthermore, for the process-color toners and the like, similar processing can be performed by preparing a desired property (specific relationship between gradation value (area ratio) and property of an output image) and taking the property that should have the dependency, on the vertical axis as illustrated by the dashed line given in FIG. 15. The specific relationship between gradation value (area ratio) and output image property is not necessarily linear but can be of any desired shape depending on the type of the toner.

The property that should have the dependency may be any desired data, such as density, gloss level, lightness, brightness, and chromaticity. The property used as the basis may be changed depending on a purpose such that, for example, gradation-processing threshold values for the white toner are based on lightness property; gradation-processing threshold values for the clear toner are based on gloss property; and gradation-processing threshold values for the process-color toners are based on density property.

A method for selecting required 256 gradation-processing threshold values from the gradation-processing threshold values for processing 4,080 gradations is described below. First, a case where a property of a special toner is in its ideal state is described below. In this case, gradation-processing threshold values for processing 256 gradations can be obtained by setting threshold values at regular intervals of 16 gradations. FIG. 17 is a diagram for describing an example of the gradation-processing threshold values obtained in this manner. In the example of FIG. 17, 0, 16, 32, . . . , and 4,080 are selected. Hereinafter, the gradation-processing threshold values selected in this manner may be sometimes referred to as "applied threshold values". FIG. 18 is a diagram illustrating an example of correspondence between applied threshold values and gradation values of an input image (input gradation values).

In the first embodiment, while the input gradation values represent 256 gradations ranging from 0 to 255, the gradation-processing threshold values represent 4,080 gradations. The gradation-processing threshold values are, for example, 96×96 dither threshold values. The 4,080 gradations that are in one-to-one correspondence with the applied threshold values ranging from 0 and 4,080 can be processed using the dither threshold values. For example, 96×96 dither threshold values having 4,080 gradations are stored in "threshold values for white toner (200-dot)" of FIG. 8.

In the example of FIG. 18, when 2 is given as the input gradation value, the applied threshold value is 32. In this case, gradation processing for the $32^{nd}$ gradation of the 4,080 gradations is performed. When 254 is given as the input gradation value, the applied threshold value is 4,064 and, in this case, gradation processing for the $4,064^{th}$ gradation is performed.

Generally, in gradation processing using dither threshold values, toner is applied only to pixels where input gradation values are larger than the dither threshold values to create halftone. In the first embodiment, each input gradation value is compared against a corresponding one of threshold values ranging from 0 to 255, into which applied threshold values are corrected, and toner is applied to pixels that are larger than the corrected threshold values, to create halftone.

A method for correcting the threshold values is described below. First, the threshold value selector 361 acquires gradation-processing threshold values, with which 4,080 gradations can be processed, and applied threshold values. For example, gradation-processing threshold values denoted as "threshold values for XX" in FIG. 8 and applied threshold values denoted as "applied threshold values for XX" that are determined as described above are fed to the threshold value selector 361. The threshold value selector 361 selects 256 gradation-processing threshold values for gradations from the gradation-processing threshold values for 4,080 gradations.

The threshold value selector 361 leaves the first applied threshold value unchanged from 0. The threshold value selector 361 replaces (corrects) every gradation-processing threshold value larger than the $(n-1)^{th}$ applied threshold value (n is an integer larger than 1) and equal to or smaller than the $n^{th}$ applied threshold value with (to) an input gradation value corresponding to the $n^{th}$ applied threshold value based on relationship between applied threshold value and input gradation value, an example of which is illustrated in FIG. 18.

For example, the threshold value selector 361 corrects gradation-processing threshold values 1 to 16 to "1", gradation-processing threshold values 17 to 32 to "2", gradation-processing threshold values 33 to 48 to "3", . . . , and gradation-processing threshold values 4,065 to 4,080 to "255". Although boundary values of the applied threshold values are at regular intervals in an ideal state, generally, the applied threshold values are not at regular intervals.

FIG. 19 and FIG. 20 are diagrams for describing an example of a process for correcting the gradation-processing threshold values. FIG. 19 is a diagram for describing an example of gradation-processing threshold values that are not corrected yet. FIG. 20 is an example of corrected gradation-processing threshold values obtained by correcting the gradation-processing threshold values of FIG. 19 using the applied threshold values illustrated in FIG. 18. For convenience of description, only a part of a 96×96 dither matrix is presented in each of FIG. 19 and FIG. 20.

The process of selecting the applied threshold values may be performed prior to a printing process and the process of correcting the gradation-processing threshold value using the applied threshold values may be performed during the printing process; alternatively, both the selecting process and the process of correcting the gradation-processing threshold value may be performed prior to the printing process.

The method for selecting the applied threshold values when the property of the special toner is in its ideal state has been described above. When the property of the special toner is in a state different from the ideal state, the applied threshold values may be changed to adapt to the state. A method for calculating applied threshold values when the property of the special toner is in a state different from the ideal state is described below.

For the clear toner, gradation-processing threshold values are prepared such that the area ratio responds linearly to the gloss level. In the first embodiment, it is assumed that 76 is defined as a target value (hereinafter, sometimes referred to as "target") of gloss level of solid (100%) clear toner. The target value is a value of a property in the ideal state (e.g., printed on prescribed paper).

Figures 21, 22:
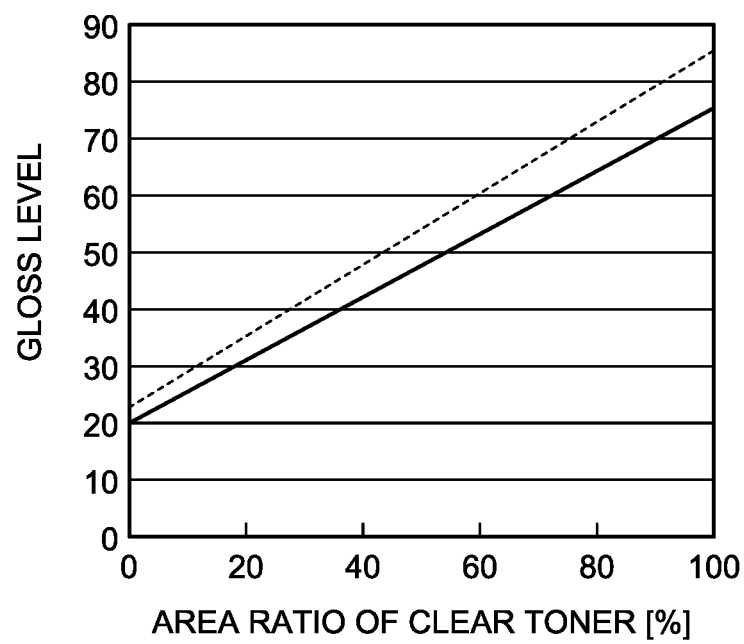
FIG. 21 is a graph of area ratio versus gloss level.
FIG. 22 is a diagram illustrating an example of correspondence between applied threshold values and gloss levels.

When printed on paper other than the prescribed paper, gloss level of a solid portion generally changes. Assume a case where, for example, paper other than the prescribed paper is used, and 22 is obtained as a gloss level of the paper and 85 is obtained as a gloss level of a solid clear-toner portion. FIG. 21 is a graph of area ratio versus gloss level of this case. In FIG. 21, the solid line indicates values of the ideal state, while the dashed line indicates actual measured values. The actual measured values can be obtained by, for example, printing a calibration sheet, which will be described later, and measuring the calibration sheet using a gloss meter.

Information about the measured gloss levels is input together with the special-toner type information as the SCon signal. The applied-threshold-value determining unit 362 analyzes the SCon signal to find that the gloss level of the paper (i.e., gloss level corresponding to the applied threshold value of 0) is 22 and that the gloss level of the solid portion (i.e., gloss level corresponding to the maximum applied threshold value of 4,080) is 85. The applied-threshold-value determining unit 362 calculates an applied threshold value required to obtain gloss level of 76 corresponding to the ideal state, using these values.

The target value of the property (information about the ideal state) may be stored in, for example, the memory 32, read out by, for example, the control unit 302, and fed to the applied-threshold-value determining unit 362. FIG. 8 illustrates an example where a target value of the white toner, a target value of the clear toner, a target value of the metallic toner, and a target value of the orange toner are read out as "target for white toner", "target for clear toner", "target for metallic toner", and "target for orange toner", respectively. One, which depends on the special-toner type information, of the target values is fed to the applied-threshold-value determining unit 362.

Based on linearity of the gloss level, calculation to find x that satisfies $(4,080-0)/(85-22)=(x-0)/(76-22)$ is performed, from which $x=3,497$ is obtained. Specifically, as illustrated in FIG. 22, a threshold value corresponding to the gloss level of 76 corresponds to the $3,497^{th}$ threshold value. This is a general ratio calculation and therefore can be performed if gloss level of paper (gloss level of a recording medium itself where no toner is applied) and gloss level of a solid portion are given. The area ratio of the clear toner in this example is $3,497/4,080=86\%$.

Figures 23, 24, 25:
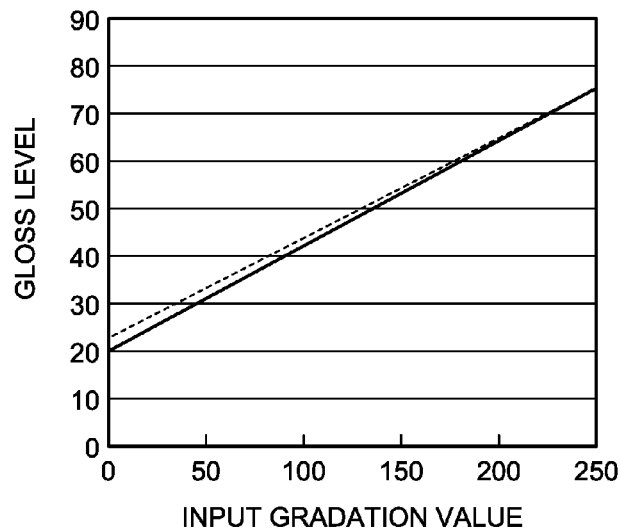
FIG. 23 is a diagram illustrating an example of applied threshold values.
FIG. 24 is a diagram illustrating an example of correspondence between applied threshold values and gloss levels.
FIG. 25 is a diagram illustrating an example of correspondence between applied threshold values and input gradation values.

In the example of FIG. 22, the applied threshold value of 3,497 corresponds to the gloss-level target value of 76. Accordingly, the applied-threshold-value determining unit 362 assigns the applied threshold value of 3,497 to the input gradation of 255 of the S plate data. The applied-threshold-value determining unit 362 assigns equidistant threshold values to gradations between the minimum value 0 and the maximum value (the applied threshold value of 3,497), thereby determining applied threshold values for each of the gradations from 0 to 255. For example, in the example of FIG. 22, the applied-threshold-value determining unit 362 assigns a value obtained by rounding off $3,497 \times K/255$ to the nearest integer to the input gradation K (K ranges from 0 to 255) as an applied threshold value of the gradation, where 3,497 is the maximum applied threshold value. FIG. 23 is a diagram illustrating an example of the applied threshold values obtained in this manner.

As a result of setting the applied threshold values as illustrated in FIG. 23, such a gloss property as indicated by the dashed line in FIG. 24, for example, can be obtained. By performing processing in this manner, an output image exhibiting stable gloss property even when paper is changed can be obtained. The solid line in FIG. 24 is identical with the ideal state illustrated in FIG. 10, and the values in FIG. 18 are used as the applied threshold values.

As described above, by preparing gradation-processing threshold values such that the area ratio is linear to the gloss level, simple calibration that yields a favorable gloss property is enabled only by measuring a gloss level of paper and a gloss level of a solid (100%) clear-toner image. Information about the gloss levels of these two areas can be obtained by, for example, printing a calibration sheet where only one 100%-clear-toner patch is formed at or near the center of paper, and measuring the patch portion and a (paper white) portion other than the patch with a gloss meter. The measurement result is imported to the DFE 200. The applied-threshold-value determining unit 362 performs the above-described calculation using the measurement result. The applied-threshold-value determining unit 362 stores and updates the calculation result of the applied threshold values in the memory 32 or the like. The calibration sheet will be described in detail later.

When the special toner is changed from one type to another, it is generally inappropriate to use the same applied threshold values for the two types. Accordingly, it is desirable to use a target value determined depending on the toner type information also in the above-described calibration. For example, for the clear toner, optimization is performed against a target value determined about the gloss level; for the white toner, optimization is performed against a target value determined about the lightness; and for each of the other toners, optimization is performed against a target value determined about a corresponding property. As will be described later, gloss level, density, and b* may be used as the property of the metallic toner, the orange toner, and the fluorescent toner, respectively.

A method for determining applied threshold values for the white toner is described below. For the white toner, gradation-processing threshold values are prepared such that the area ratio linearly responds to the lightness. In the first embodiment, it is assumed that 88 is defined as a target lightness for solid (100%) white toner on black paper. When printed on paper other than prescribed paper, lightness of a solid portion generally changes. Assume a case where, for example, paper other than the prescribed paper is used, and 94 is obtained as lightness of a solid white-toner portion on the black paper. Further assume that, in this case, from calculation based on linearity of the lightness, it is found that a threshold value corresponding to the lightness of 88 corresponds to the $3,766^{th}$ threshold value. The applied-threshold-value determining unit 362 calculates applied threshold values for the 256 gradations of the white toner from this calculation result. FIG. 25 is a diagram illustrating an example of correspondence between applied threshold values and input gradation values calculated in this manner. Lightness of 0%-area-ratio white toner and lightness of 100%-area-ratio white toner can be obtained by, for example, printing a calibration sheet where only one 100%- white-toner patch is formed on black paper, and measuring the calibration sheet using a spectral colorimeter. The measurement result is imported to the DFE 200. The applied-threshold-value determining unit 362 performs the above-described calculation using the measurement result. The applied-threshold-value determining unit 362 stores and updates the calculation result of the applied threshold values in the memory 32 or the like.

Figure 26:
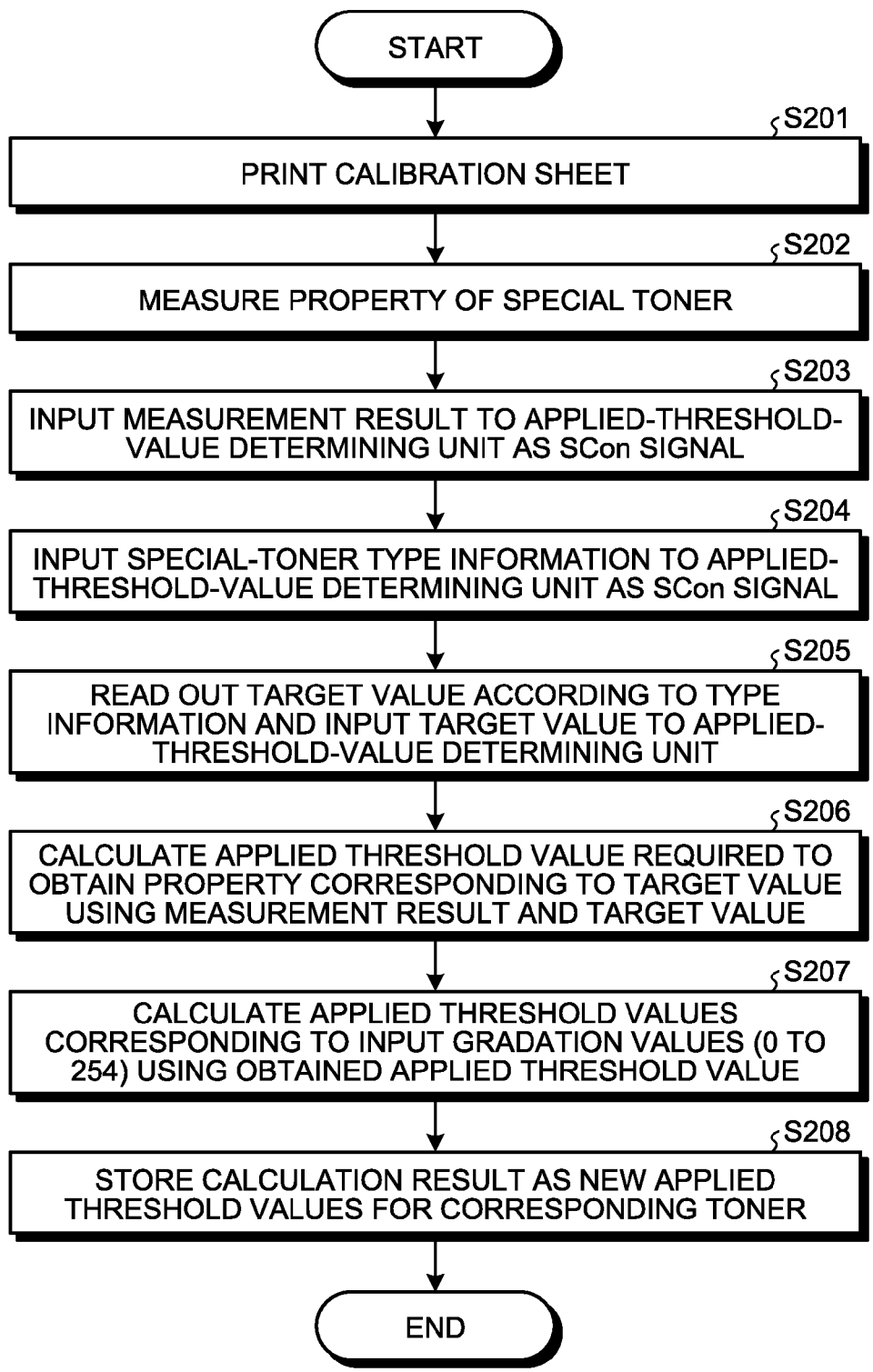
FIG. 26 is a flowchart illustrating an example of an overall flow of a threshold-value determining process.

FIG. 26 is a flowchart illustrating an example of an overall flow of a threshold-value determining process. The threshold-value determining process is a process performed by the applied-threshold-value determining unit 362 or the like to determine applied threshold values. The threshold-value determining process may be performed prior to a printing process in response to an instruction from a user, for example. A configuration, in which when, for example, the gradation-processing threshold value is equal to an input gradation (e.g., 256), the threshold-value determining process is skipped or, put another way, the applied-threshold-value determining unit 362 is not provided, may be employed.

The control unit 302 generates a calibration image in response to an instruction from a user or the like, and prints a calibration sheet where the calibration image is formed (S201). When the printer 300 includes a measuring device, such as a gloss meter, the control unit 302 measures a property of a special toner using the measuring device (S202). The control unit 302 inputs the measured property (measurement result) as the SCon signal to the applied-threshold-value determining unit 362 (S203). Alternatively, the property may be measured using a measuring device provided external to the printer 300 and the measuring device may input a measurement result to (the applied-threshold-value determining unit 362 of) the printer 300.

The control unit 302 inputs special-toner type information stored in the memory 32, for example, as the SCon signal to the applied-threshold-value determining unit 362 (S204). The control unit 302 reads out, from the memory 32 or the like, a target value of a property that depends on the type information and inputs the target value to the applied-threshold-value determining unit 362 (S205).

The applied-threshold-value determining unit 362 calculates an applied threshold value required to obtain a property corresponding to a target value for a solid portion, using the measurement result of the property and the target value (S206). In the example of FIG. 21 and FIG. 22, the applied threshold value of 3,497 corresponding to the target value of 76 is obtained from calculation. The applied threshold value corresponds to the maximum input gradation value (e.g., 255).

The applied-threshold-value determining unit 362 calculates applied threshold values corresponding to the other input gradation values (e.g., 0 to 254) using the obtained applied threshold value (S207). The applied-threshold-value determining unit 362 stores the calculated applied threshold values in the memory 32, for example, as new applied threshold values for the corresponding toner (S208). The applied threshold values stored in this manner are used when a printing process (gradation processing) is performed.

Figure 27:
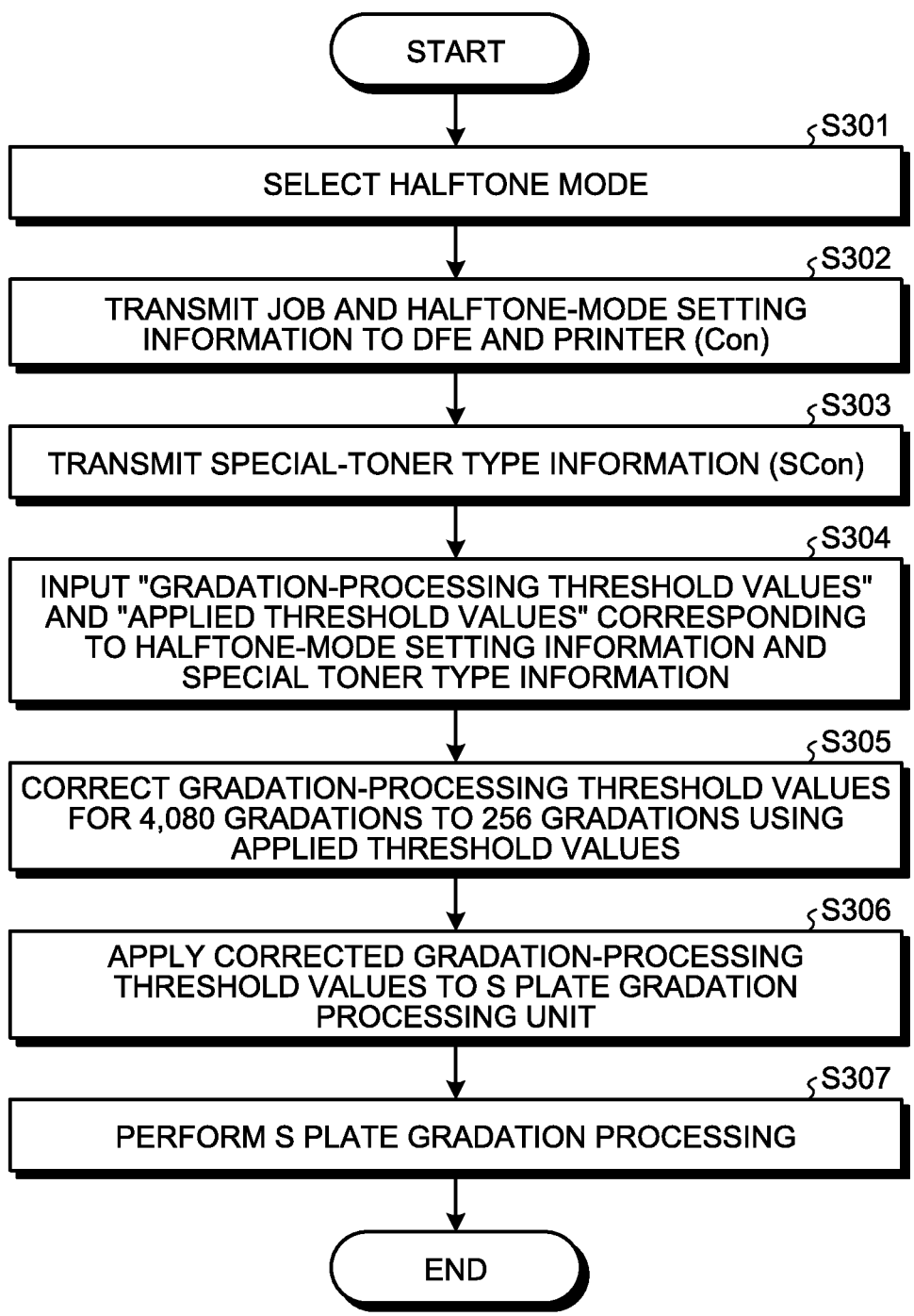
FIG. 27 is a flowchart illustrating an example of an overall flow of gradation processing.

Gradation processing is described below with reference to FIG. 27. FIG. 27 is a flowchart illustrating an example of an overall flow of gradation processing. Although FIG. 27 illustrates only processing pertaining to the gradation processing unit 320, during printing, processing (gamma conversion processing) pertaining to the gamma conversion processing unit 310 may be performed in conjunction therewith.

At printing, a user designates a halftone mode using the printer driver, for example. The host computer 100 selects the user-designated halftone mode (S301). The host computer 100 transmits a job and halftone-mode setting information indicating the selected halftone mode to the DFE 200 and the printer 300 (S302). The halftone-mode setting information may be input to the image processing circuit 38 in a form of being contained in the Con signal. The control unit 302, for example, transmits special-toner type information to the image processing circuit 38 (S303).

The threshold value selector 361 accepts input of gradation-processing threshold values and applied threshold values corresponding to the halftone-mode setting information and the special toner type information (S304). The threshold value selector 361 corrects the gradation-processing threshold values of the number of gradations (e.g., 4,080) larger than an input gradation (e.g., 256) to gradations of the input gradation using the applied threshold values (S305).

The control unit 302 sets the corrected gradation-processing threshold values in the S plate gradation processing unit 325 (S306). The S plate gradation processing unit 325 performs S plate gradation processing using the set gradation-processing threshold values (S307).

Figure 28:
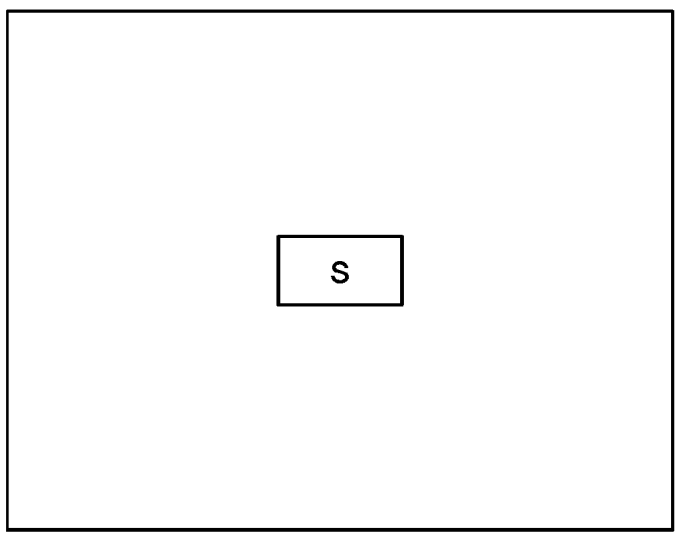
FIG. 28 is a diagram illustrating an example of a calibration sheet.
Figure 29:
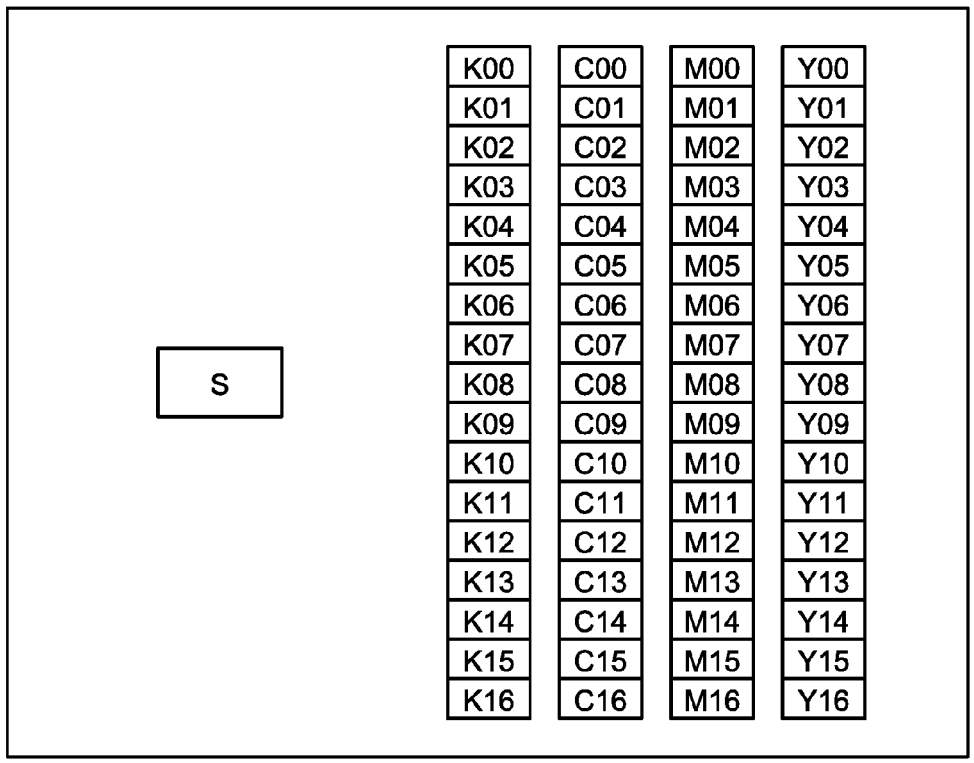
FIG. 29 is a diagram illustrating an example of the calibration sheet.

A calibration sheet for property measurement of a special toner is described below. FIG. 28 and FIG. 29 are diagrams each illustrating an example of the calibration sheet. As described earlier, when only a single 100%-special toner patch is to be printed, a calibration sheet such as illustrated in FIG. 28, for example, can be used. The rectangle denoted by "S" indicates a 100%-special toner patch. Use of a calibration sheet such as illustrated in FIG. 28 entails a need for another calibration sheet for the process colors. To eliminate this need, a calibration sheet where a special toner patch and patches of C, M, Y, and K are arranged in one page as illustrated in FIG. 29 may be used. However, when the special toner is the white toner that is to be printed on black paper, it will be inappropriate to print a calibration sheet where the white toner and the process-color toners are arranged in one page. Accordingly, a configuration that uses the layout of FIG. 29 for the clear toner but uses such a layout as illustrated FIG. 28 for the white toner may be employed. Meanwhile, K00 to K16 of FIG. 29 are black toner patches of various densities, which may be in stepwise gradation, for example. The same applies to C00 to C16, M00 to M16, and Y00 to Y16.

Examples, in each of which a special toner other than the clear toner and the white toner is used, are described below. Note that the examples described below are different only in the type of the special toner and therefore similar in apparatus configuration and flowchart to the examples of the clear toner and the white toner. Hereinafter, a method for setting the gradation-processing threshold values is described below for each of the special toners.

Example of Orange Toner

An example where the orange toner is used as the special toner is described below. The orange toner is used mainly for the purpose of increasing a color gamut by being used together with the process colors. For example, the orange toner is used to further increase color reproducibility rather than to add functional value, such as gloss and metallic texture. Accordingly, gradation-processing threshold values should be set so as to enable stable color reproduction by setting a target density value as in the case of the process colors. When the orange toner is to be used, the color transformation processing unit 222 performs color separation into five colors (C, M, Y, K, and Or (Or denotes "orange")). Any conventionally-used color separation method can be used in this color separation.

Figure 30:
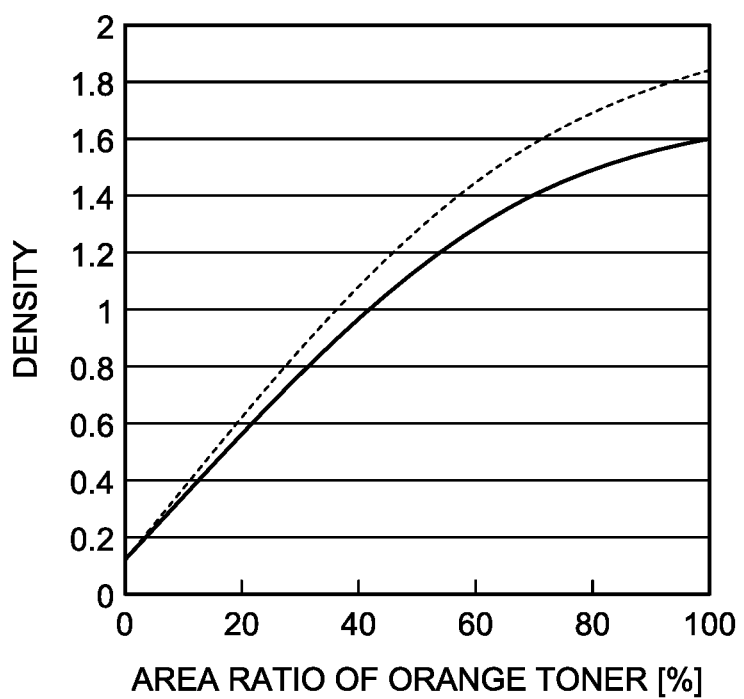
FIG. 30 is a graph of area ratio versus density of an orange toner.

FIG. 30 is a graph of area ratio versus density of the orange toner. The solid line of FIG. 30 indicates target density values of the orange toner, while the dashed line indicates measured density values. Relationship between input gradation value and density can be obtained through measurement using a calibration sheet, for example. Applied threshold values that are equidistant in relation to the 4,080 gradations as illustrated in FIG. 18, for example, can be used in the calibration sheet to be printed. Hence, correspondence relationship among input gradation value, density, and applied threshold value can be obtained as illustrated in FIG. 31.

FIG. 31 illustrates an example where a calibration sheet, in which 17 patches are printed as in FIG. 29, is used. For example, polynomial approximation is performed on values obtained from the 17 patches, for interpolation of the data. As a result, relationship between density and applied threshold value is determined for each of the 4,080 gradations. A graph, in which the applied threshold value is taken on the horizontal axis and the measured density is taken on the vertical axis to plot the calculated values, has a shape similar to FIG. 30. FIG. 32 is a diagram illustrating correspondence relationship between applied threshold value and input gradation value calculated for all of the 4,080 gradations.

A target density value is defined for every input gradation value. Applied threshold values corresponding to input gradation values can be determined by searching for applied threshold values corresponding to densities closest to the target density values using the correspondence relationship of FIG. 32. FIG. 33 is a diagram illustrating an example of applied threshold values obtained in this manner. Note that the applied threshold value for the $0^{th}$ gradation is invariably fixed to 0.

The above-described method for determining the applied threshold values is also applicable to process-color toner plate. In this case, as the calibration sheet, the calibration sheet illustrated in FIG. 34 can be used. In FIG. 34, S00 to S16 represent gradation patches of the special toner (the orange toner).

As described earlier, for example, the control unit 302 may have a function as a generator that generates a calibration image, which is an image to be printed on a calibration sheet. For example, when the white toner is to be used as the special toner, the control unit 302 may generate a calibration image such as of FIG. 28 to be printed on one page of a calibration sheet and a calibration image of the process-color toners to be printed on a page, other than the one page, of the calibration sheet. When the clear toner is to be used as the special toner, the control unit 302 may generate such a calibration image for printing clear toner patches, which is smaller in number than process-color toner patches, on the same page as the process-color toner patches as illustrated FIG. 29. When the orange toner is to be used as the special toner, the control unit 302 may generate such a calibration image for printing equal numbers of orange toner patches and process-color toner patches on a single page as illustrated FIG. 34.

As described above, the control unit 302 may generate a calibration image, in which at least any one of the number of areas where a special toner to be used is formed and a page where the special toner is formed is changed depending on a type of the special toner.

With the above-described procedure, an output image exhibiting optimal gradation characteristics can be obtained when the orange toner is mounted, and therefore an image having a wide color gamut and high image quality can be provided. Furthermore, the procedure enables a system, in which a plurality of special toners are settable and printable in the single printer 300, to perform optimal gradation conversion depending on a property of each of the special toners, thereby obtaining a printout of optimal image quality. The above-described procedure is limited to the orange toner, but applicable to all wide-color-gamut reproduction toners, such as the green toner, to be used in addition to the process-color toners.

Example of Metallic Toner

Figure 35:
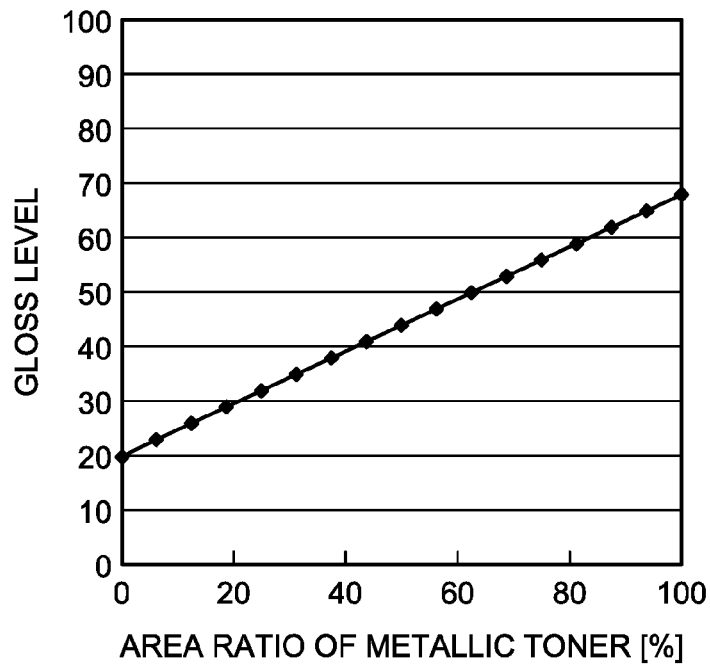
FIG. 35 is a graph of area ratio versus gloss level of a metallic toner.

An example where the metallic toner is used as the special toner is described below. The metallic toner is used when, for example, metallic glossy texture of the metallic toner is desired by a user as added value. The metallic toner has more reflection components than the process-color toners do. Accordingly, it is desirable to specify gradation characteristics using gloss level as an index. For this reason, as in the case of the clear toner, gradation-processing threshold values are set such that the area ratio is linear to the gloss level. FIG. 35 is a graph of area ratio versus gloss level of the metallic toner. A processing procedure for the metallic toner is identical to the processing procedure for the clear toner except for the target values, and repeated description is omitted.

An output image exhibiting optimal gradation characteristics can be obtained in this manner when the metallic toner is mounted. Accordingly, not only adding value of metallic gloss but also providing an image having high image quality can be achieved. Furthermore, when a system where a plurality of special toners are settable and printable in the single printer 300 is used, a printout having optimal image quality can be obtained by performing optimal gradation conversion depending on a property of each of the special toners.

Example of UV Toner and Fluorescent Toner

An example where at least any one of the UV toner and the fluorescent toner is mounted as the special toner is described below. The UV toner has an absorption band in the wavelength region of ultraviolet light (less than 400 nm) and is transparent in the visible light region. The UV toner has characteristics that the UV toner is invisible under light of a visible-light source but exhibits fluorescence property of emitting visible light only when irradiated with black light containing ultraviolet light. The UV toner may be used for the purpose of inserting information that is generally not required to be visible. Examples of the information to be inserted include a marking that allows identifying a document taken out without permission, embedded attribute information about, e.g., a creator and creation date, a marking that is permitted only to a specific creator, and a message consigned to a specific receiver.

The fluorescent toner is visible even under light of a visible-light source. The fluorescent toner is used to make a printout prominent using a fluorescent yellow color that is generally difficult to render with the process toners. For example, the fluorescent toner is used to highlight a portion where attention is focused as with what is generally referred to as a fluorescent marker.

In such uses, demands on gradation characteristics are lower than demands on the other special toners, and gradation jump may be even unperceivable.

Because a disadvantage will not occur in image quality even when the same threshold values as for the clear toner are set as threshold values for the UV toner, the same threshold values as for the clear toner are set. Stability is not strictly required of the UV toner, and thus an initial condition is maintained invariably. Specifically, the applied threshold values illustrated in FIG. 18, for example, is used invariably. Therefore, when the UV toner is used, it is unnecessary to print a calibration sheet.

b* of gradation patches is measured to determine threshold values for the fluorescent toner. Note that b* is a value of the b* coordinate in the L*a*b* space.

Figure 36:
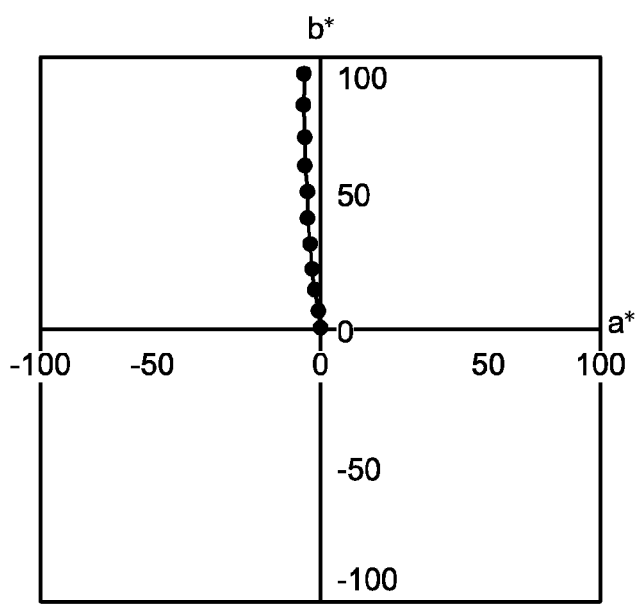
FIG. 36 is a graph obtained by plotting a result of color measurement of a printout printed with a fluorescent toner on the a*b* plane.

The fluorescent toner has characteristics that the fluorescent toner absorbs electromagnetic radiation in the region from ultraviolet to blue and emits yellow fluorescence. Because lightness of yellow does not change greatly throughout the entire gradation region and the dynamic range of yellow is considerably small, target lightness value cannot be defined for each of the gradation values. By contrast, as can be known from L*a*b* color measurement, the fluorescent toner has a wide dynamic range of b*. Accordingly, gradation-processing threshold values are determined such that the area ratio is linear to b*. FIG. 36 is a graph obtained by plotting a result of color measurement of a printout, on which the fluorescent toner is printed from 0 to 100% in increments of 10%, on the a*b* plane. As illustrated in FIG. 36, the fluorescent toner has a wide dynamic range of b*.

Because stability is not strictly required of the fluorescent toner, it suffices to maintain initial condition invariably. Specifically, the applied threshold values illustrated in FIG. 18, for example, are used invariably. Therefore, when the fluorescent toner is used, it is unnecessary to print a calibration sheet.

As described above, when the UV toner or the fluorescent toner is used, demands on gradation characteristics are low, and gradation jump may be even unperceivable. Even when calibration is unreasonably performed in such a case, accuracy of the calibration will be low, and an advantage greater than a user's work is less likely to be obtained. In such a case, a user's work can be saved by not performing unnecessary calibration rather than performing calibration invariably for every special toner.

Modification

Figure 37:
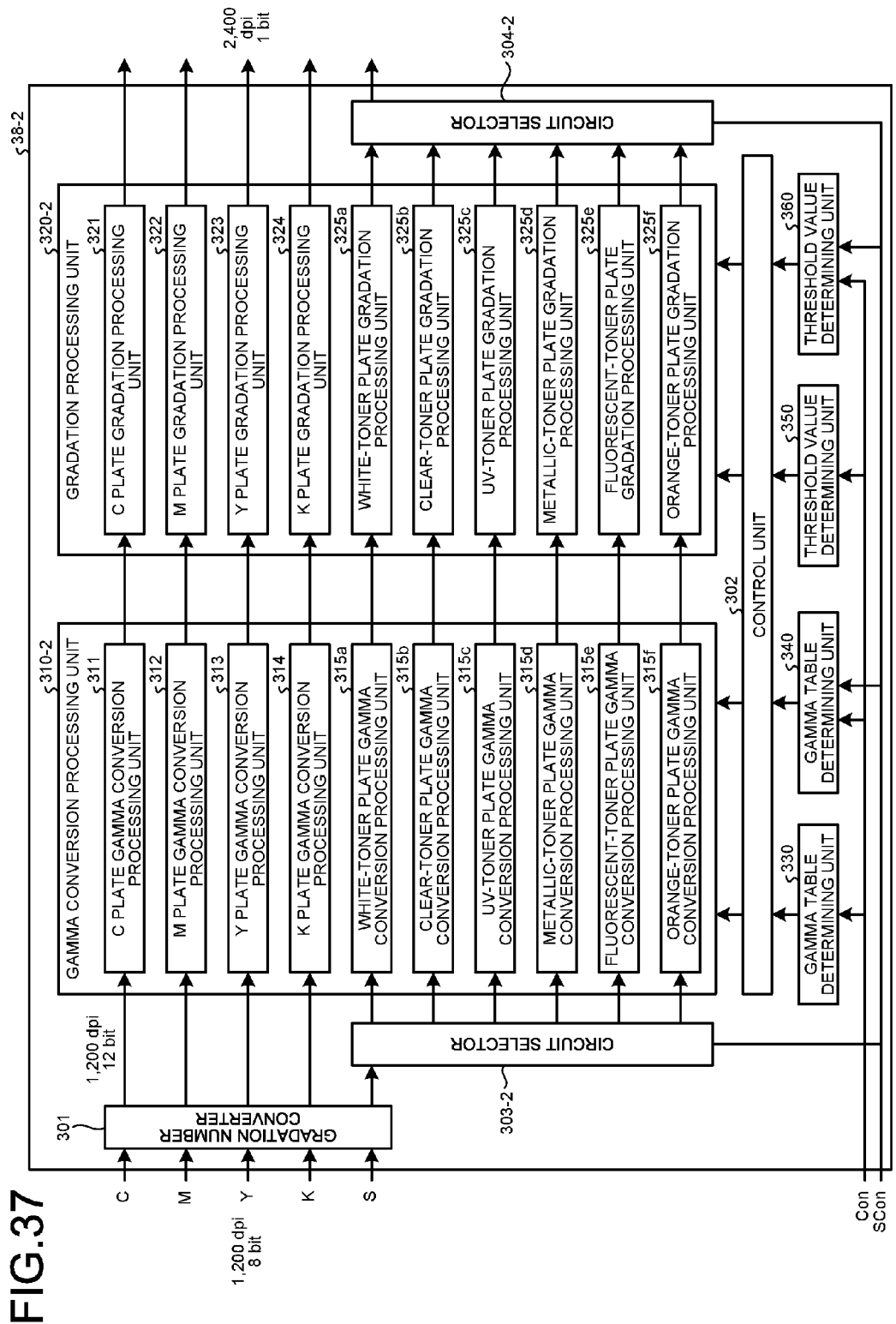
FIG. 37 is a block diagram illustrating an example functional configuration of an image processing circuit of a printer according to a modification of the first embodiment.

FIG. 37 is a block diagram illustrating an example functional configuration of an image processing circuit 38-2 of a printer according to a modification of the first embodiment. As illustrated in FIG. 37, the image processing circuit 38-2 includes the gradation number converter 301, a gamma conversion processing unit 310-2, a gradation processing unit 320-2, the gamma table determining unit 330, the gamma table determining unit 340, the threshold value determining unit 350, the threshold value determining unit 360, the control unit 302, a circuit selector 303-2, and a circuit selector 304-2.

The modification differs from the first embodiment (FIG. 5) in that, for the plurality of special toners, as many gamma conversion processing units and as many gradation processing units as the number of the special toners that are mountable are prepared, and the circuit selectors 303-2 and 304-2 for selecting the processing units (circuits) to be used are provided.

For example, the gamma conversion processing unit 310-2 includes, in addition to the C plate gamma conversion processing unit 311, the M plate gamma conversion processing unit 312, the Y plate gamma conversion processing unit 313, and the K plate gamma conversion processing unit 314, a white-toner plate gamma conversion processing unit 315a, a clear-toner plate gamma conversion processing unit 315b, a UV-toner plate gamma conversion processing unit 315c, a metallic-toner plate gamma conversion processing unit 315d, a fluorescent-toner plate gamma conversion processing unit 315e, and an orange-toner plate gamma conversion processing unit 315f.

For example, the gradation processing unit 320-2 includes, in addition to the C plate gradation processing unit 321, the M plate gradation processing unit 322, the Y plate gradation processing unit 323, and the K plate gradation processing unit 324, a white-toner plate gradation processing unit 325a, a clear-toner plate gradation processing unit 325b, a UV-toner plate gradation processing unit 325c, a metallic-toner plate gradation processing unit 325d, a fluorescent-toner plate gradation processing unit 325e, and an orange-toner plate gradation processing unit 325f.

The circuit selector 303-2 selects a processing unit, to which an image for a special-toner plate is to be input, from the white-toner plate gamma conversion processing unit 315a, the clear-toner plate gamma conversion processing unit 315b, the UV-toner plate gamma conversion processing unit 315c, the metallic-toner plate gamma conversion processing unit 315d, the fluorescent-toner plate gamma conversion processing unit 315e, and the orange-toner plate gamma conversion processing unit 315f.

The circuit selector 304-2 selects a processing unit from which an image for a special-toner plate having undergone gradation processing is to be output, from the white-toner plate gradation processing unit 325a, the clear-toner plate gradation processing unit 325b, the UV-toner plate gradation processing unit 325c, the metallic-toner plate gradation processing unit 325d, the fluorescent-toner plate gradation processing unit 325e, and the orange-toner plate gradation processing unit 325f.

With the configuration described above, gamma conversion processing and gradation processing can be performed depending on a property of each of the plurality of special toners and, as a result, an output image exhibiting optimal gradation characteristics can be obtained.

The circuit selector 303-2 and the circuit selector 304-2 switch the processing units, to which processing signal data is to be fed, based on type information obtained from the SCon signal, for example.

In the present modification, the hardware configuration can be larger than the configuration of the first embodiment. In particular, the larger the number of types of the special toner, the more the hardware configuration is likely to be larger. The configuration of the first embodiment (FIG. 5) can be further simplified in hardware configuration, so that an output image exhibiting optimal gradation characteristics can be provided with high productivity and low cost.

Because implementation of the DFE 200 needs to be changed to adapt to control operations and/or to add various functions, the DFE 200 inclusive of the image processing circuit 27 is usually implemented in software. By contrast, the image processing circuit 38 on the printer 300, inclusive of electrical component control of a main body of the printer 300 inclusive of the engine 35, is usually implemented in hardware.

When the image processing circuit 38 is implemented in hardware as illustrated in FIG. 5, high productivity required of the printer 300, which is a high-end commercial printer, can be obtained at low cost. Consequently, productivity that will sufficiently satisfy needs of heavy users having a considerably large daily printing amount can be achieved. Software configuration and hardware configuration of the first embodiment are not limited to the foregoing, and any configuration may be employed.

Second Embodiment

In the first embodiment, the DFE 200 performs the total-amount limiting process and processing upstream thereof, and the printer 300 performs gradation processing. By contrast, in a second embodiment, a DFE 200-3 performs gradation processing and processing upstream thereof and transmits the processed data to a printer 300-3.

Figure 38:
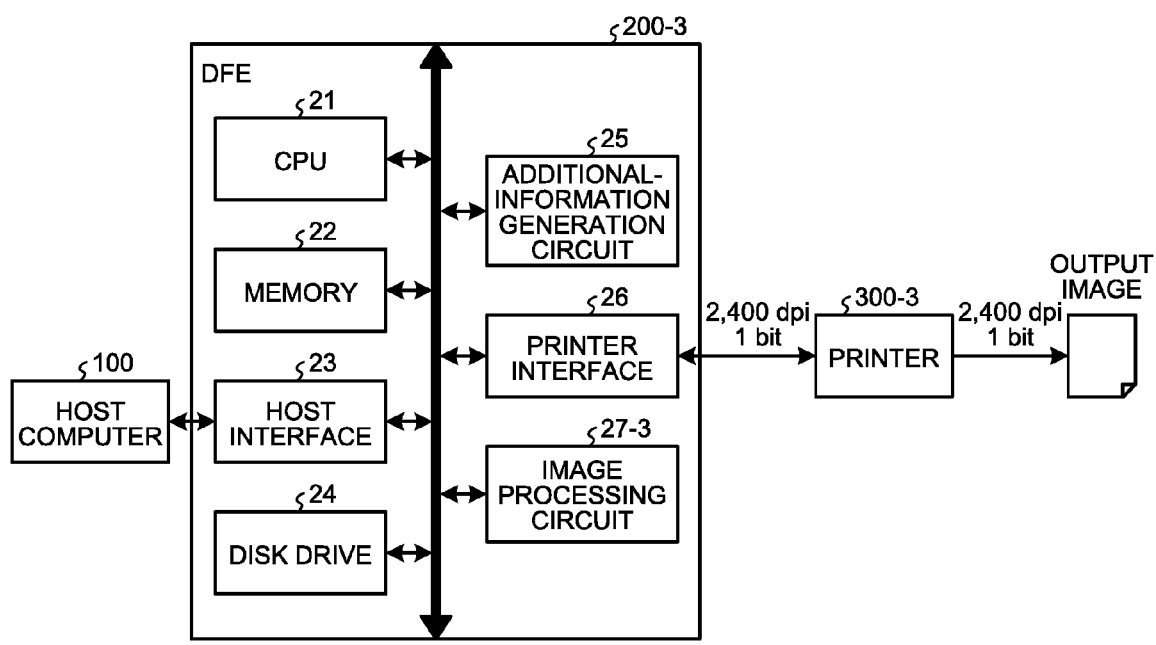
FIG. 38 is a diagram illustrating an example of a hardware configuration of a DFE of a second embodiment.

FIG. 38 is a diagram illustrating an example of a hardware configuration of the DFE 200-3 of the second embodiment. As illustrated in FIG. 38, the DFE 200-3 includes the CPU 21, the memory 22, the host interface 23, the printer interface 26, the disk drive 24, the additional-information generation circuit 25, and an image processing circuit 27-3. Because functions of the second embodiment are similar to the first embodiment except for the image processing circuit 27-3, like reference numerals are used to indicate like or analogous elements, and repeated description is omitted.

The image processing circuit 27-3 includes, in addition to the functions of the image processing circuit 27 of the first embodiment, a gamma conversion processing function and a gradation processing function similar to the gamma conversion processing function and the gradation processing function provided by the image processing circuit 38 of the printer 300 of the first embodiment.

The printer 300-3 differs from the printer 300 of the first embodiment in not including the functions that are added to the DFE 200-3.

FIG. 39 is a block diagram illustrating an example functional configuration of the image processing circuit 27-3. Because each element illustrated in FIG. 39 is similar to any one of the elements included in the DFE 200 (FIG. 4) or the printer 300 (FIG. 5) of the first embodiment, like reference numerals are used to indicate like or analogous elements, and repeated description is omitted. However, the SCon signal needs to be fed from the printer 300-3 via the printer interface 26.

According to the second embodiment, because image processing functions can be consolidated to one location, the configuration of the image forming system is prevented from becoming complicated, and control is facilitated in its entirety. Because image-processed data is transmitted to the printer 300-3, what is to be performed by the printer 300-3 is only to print the received data.

Assume a case where all gradation processing in (the image processing circuit 27-3 of) the DFE 200-3 is implemented in software. Because gradation processing involves a large number of steps, in this case, it is possible that high productivity demanded of a high-end commercial printer cannot be obtained. For example, when used to print approximately several tens of sheets per minute, the system can provide sufficient productivity at low cost; however, the system can fail to provide productivity that will satisfy heavy users having a considerably large daily printing amount. However, by implementing the image processing circuit 27-3 in the DFE 200-3 in hardware as required, such an undesirable situation can be avoided.

Program instructions to be executed in the image processing apparatus of the embodiment may be provided in a form stored in a ROM or the like in advance.

The program instructions to be executed in the image processing apparatus of the embodiment may be configured to be recorded in a non-transitory, computer-readable recording medium, such as a CD-ROM, a flexible disk (FD), a CD-R, and a DVD (Digital Versatile Disk), as an installable file or an executable file to be provided as a computer program product.

The program instructions to be executed in the image processing apparatus of the embodiment may be configured to be stored in a computer connected to a network, such as the Internet, and provided by being downloaded via the network. The program instructions to be executed in the image processing apparatus of the embodiment may be configured to be provided or delivered via a network, such as the Internet.

The program instructions to be executed in the image processing apparatus of the embodiment have a module structure including the elements described above. From the viewpoint of actual hardware, a CPU (processor) reads out the program instructions from the ROM and executes the program instructions to load the elements into a main storage device, thereby generating the elements on the main storage device.

According to an embodiment, an output image exhibiting more appropriate property depending on a type of a special toner can be obtained.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image processing apparatus comprising:
circuitry configured to:
select a type of a special toner other than a process color toner from a plurality of types of special toners, and a gamma table based on the type of the special toner which is selected,
determine a parameter for image processing for a special toner plate depending on the type of the special toner,
process an image of the special toner plate differently than the process color toner using the determined parameter, wherein the image processing comprises at least one of a gradation processing and a gamma conversion processing,
form an output image on a recording medium, wherein the image processing is gradation processing, and the parameter is a threshold value for the gradation processing, wherein for each type of the special toner, the threshold value is determined such that a specific relationship holds between area ratio of the special toner and predetermined property of an output image after performing the gradation processing,
determine the threshold value depending on the type of the special toner to be used, wherein a number of gradations processable in the gradation processing using the threshold value is larger than an input gradation number that is a number of gradations in an input image,
determine an applied threshold value for correcting the threshold value such that a number of gradations in the output image is equal to the input gradation number, and
correct the threshold value using the applied threshold value.

2. The image processing apparatus according to claim 1, wherein the circuitry is configured to determine the applied threshold value such that a maximum value of the property is obtained if an input gradation value is a maximum value, and the specific relationship holds between the property and the area ratio of the special toner if the input gradation value is other than the maximum value.

3. The image processing apparatus according to claim 1, wherein:
the circuitry is further configured to:
determine an applied threshold value for correcting the threshold value such that a measured value of the property of the output image after the gradation processing is performed on the image of the special toner plate is a target value of the property, and
correct the threshold value using the applied threshold value.

4. The image processing apparatus according to claim 1, wherein:
the special toner comprises any one of a clear toner and a metallic toner, and
the property is gloss level.

5. The image processing apparatus according to claim 1, wherein:
the special toner comprises a white toner, and
the property is lightness.

6. The image processing apparatus according to claim 1, wherein:
the special toner comprises a wide-color-gamut reproduction toner for increasing a color gamut, and
the property is density.

7. The image processing apparatus according to claim 1, wherein:
the special toner comprises any one of a clear toner and a metallic toner,
the property is gloss level, and
the specific relationship is a linear relationship.

8. The image processing apparatus according to claim 1, wherein:
the special toner comprises a white toner,
the property is lightness, and
the specific relationship is a linear relationship.

9. The image processing apparatus according to claim 1, wherein the circuitry is configured to generate a calibration image that is an image to be formed on a recording medium for measurement of a predetermined property of an output image after performing the gradation processing, at least any one of a number of at least one area where the special toner is formed and a page where the special toner is formed being changed in the calibration image depending on the type of the special toner to be used.

10. The image processing apparatus according to claim 9, wherein the circuitry is configured to, if the special toner comprises any one of a clear toner and a metallic toner, generate the calibration image such that the number of at least one area where the special toner is formed is smaller than a number of at least one area where a process-color toner is formed, and the at least one area where the special toner is formed and the at least one area where the process-color toner is formed are on the same page.

11. The image processing apparatus according to claim 9, wherein the circuitry is configured to, if the special toner comprises a white toner, generate the calibration image such that the number of at least one areas where the special toner is formed is smaller than a number of at least one where a process-color toner is formed, and the at least one area where the special toner is formed is on a page different from a page on which the at least one area where a process-color toner is formed is.

12. The image processing apparatus according to claim 9, wherein the circuitry is configured to, if the special toner comprises a wide-color-gamut reproduction toner for increasing a color gamut, generate the calibration image such that the number of at least one area where the special toner is formed is equal to a number of at least one area where a process-color toner is formed, and the at least one area where the special toner is formed and the at least one area where the process-color toner is formed are on the same page.

13. The image processing apparatus according to claim 1, wherein:
the image processing is gamma conversion processing, and
the parameter is a gamma table for the gamma conversion processing.

14. An image forming apparatus comprising:
the image processing apparatus according to claim 1; and
an image forming device configured to form an image of a process-color toner plate and the special toner plate on a recording medium.

15. An image processing method comprising:
selecting a type of a special toner other than a process color toner from a plurality of types of special toners;
selecting a gamma table based on the type of the special toner which is selected;
determining a parameter for image processing for a special toner plate depending on the type of the special toner;

processing an image of the special toner plate differently than the process color toner using the determined parameter, wherein the image processing comprises at least one of a gradation processing and a gamma conversion processing;

forming an output image on a recording medium, wherein the image processing is gradation processing, and the parameter is a threshold value for the gradation processing, wherein for each type of the special toner, the threshold value is determined such that a specific relationship holds between area ratio of the special toner and predetermined property of an output image after performing the gradation processing;

determining the threshold value depending on the type of the special toner to be used, wherein a number of gradations processable in the gradation processing using the threshold value is larger than an input gradation number that is a number of gradations in an input image;

determining an applied threshold value for correcting the threshold value such that a number of gradations in the output image is equal to the input gradation number; and correcting the threshold value using the applied threshold value.

16. A non-transitory computer-readable recording medium including program instructions that cause a computer to perform:

selecting a type of a special toner other than a process color toner from a plurality of types of special toners;

selecting a gamma table based on the type of the special toner which is selected;

determining a parameter for image processing for a special toner plate depending on the type of the special toner;

processing an image of the special toner plate differently that the process color toner using the determined parameter, wherein the image processing comprises at least one of a gradation processing and a gamma conversion processing;

forming an output image on a recording, wherein the image processing is gradation processing, and the parameter is a threshold value for the gradation processing, wherein for each type of the special toner, the threshold value is determined such that a specific relationship holds between area ratio of the special toner and predetermined property of an output image after performing the gradation processing;

determining the threshold value depending on the type of the special toner to be used, wherein a number of gradations processable in the gradation processing using the threshold value is larger than an input gradation number that is a number of gradations in an input image;

determining an applied threshold value for correcting the threshold value such that a number of gradations in the output image is equal to the input gradation number; and correcting the threshold value using the applied threshold value.

* * * * *